United States Patent [19]

Baum et al.

[11] Patent Number: 5,619,713
[45] Date of Patent: Apr. 8, 1997

[54] APPARATUS FOR REALIGNING DATABASE FIELDS THROUGH THE USE OF A CROSSPOINT SWITCH

[75] Inventors: Richard I. Baum, Poughkeepsie; Glen A. Brent, Fishkill; Donald H. Gibson, Salt Point; David B. Lindquist, Poughkeepsie, all of N.Y.

[73] Assignee: International Business Machines Corporation, Armonk, N.Y.

[21] Appl. No.: 390,143

[22] Filed: Feb. 17, 1995

Related U.S. Application Data

[60] Continuation of Ser. No. 993,270, Feb. 11, 1993, abandoned, which is a division of Ser. No. 499,844, Mar. 27, 1990, Pat. No. 5,210,870.

[51] Int. Cl.$^6$ .................................................. G06F 7/24
[52] U.S. Cl. ...................... 395/800; 395/612; 364/239.3; 364/282.1; 364/DIG. 1
[58] Field of Search .................................. 395/800, 600; 364/239.3, 282.1, DIG. 1

[56] References Cited

U.S. PATENT DOCUMENTS

| | | | |
|---|---|---|---|
| 3,394,731 | 7/1968 | Flusche et al. | 364/200 |
| 3,713,107 | 1/1973 | Barsamian | 340/172.5 |
| 3,976,980 | 8/1976 | Hertz | 395/600 |
| 4,476,524 | 10/1984 | Brown et al. | 364/200 |
| 4,497,039 | 1/1985 | Kitakami et al. | 364/900 |
| 4,506,326 | 3/1985 | Shaw et al. | 364/300 |
| 4,644,471 | 2/1987 | Kojima et al. | 364/300 |
| 4,734,877 | 3/1988 | Sakata et al. | 364/730 |
| 4,751,635 | 6/1988 | Kret | 395/600 |
| 4,779,182 | 11/1988 | Torii et al. | 364/200 |
| 4,799,152 | 1/1989 | Chuang et al. | 364/200 |
| 5,187,787 | 2/1993 | Skeen et al. | 395/600 |

FOREIGN PATENT DOCUMENTS

| | | |
|---|---|---|
| 0066061 | 12/1982 | European Pat. Off. . |
| 0070119 | 1/1983 | European Pat. Off. . |
| 0178369 | 3/1989 | Japan . |
| 2235798 | 3/1991 | United Kingdom . |
| 8912277 | 12/1989 | WIPO . |

OTHER PUBLICATIONS

Nikkei Electronics, Feb. 9, 1987, No. 414, by Torii et al, entitled "CPU Integrated Data Base Processor . . . Data Bases".

IBM Technical Disclosure Bulletin, vol. 31, No. 1, Jun. 1988, pp. 199–202, entitled "Improved Hash and Index Searching Tech . . . Memory" by Bozman et al.

IBM TEchnical Disclosure Bulletin, vol. 31, No. 1, Jun. 1988, pp. 219–225, entitled "Relational Assignments For Distributed Database Systems" by D. Cornell et al.

IBM TEchnical Disclosure Bulletin, vol. 30, No. 5, Nov. 1987, entitled "Parallel Equi–Join Algoritm . . . Operations" by G. Pfister.

(List continued on next page.)

*Primary Examiner*—Meng-Ai T. An
*Assistant Examiner*—John Harrity
*Attorney, Agent, or Firm*—Lynn L. Augspurger

[57] ABSTRACT

A processor functioning as a coprocessor attached to a central processing complex provides efficient execution of the functions required for database processing: sorting, merging, joining, searching and manipulating fields in a host memory system. The specialized functional units: a memory interface and field extractor/assembler, a Predicate Evaluator, a combined sort/merge/join unit, a hasher, and a microcoded control processor, are all centered around a partitioned Working Store. Each functional unit is pipelined and optimized according to the function it performs, and executes its portion of the query efficiently. All functional units execute simultaneously under the control processor to achieve the desired results. Many different database functions can be performed by chaining simple operations together. The processor can effectively replace the CPU bound portions of complex database operations with functions that run at the maximum memory access rate improving performance on complex queries.

3 Claims, 26 Drawing Sheets

OTHER PUBLICATIONS

Computerworld Article, Jul. 27, 1987, "Britton Lee UnCorke Data Base Series".

IEEE Computer Society Press, Jul. 1986, pp. 1233–1244, "A Relational Database Machine Organization For Parallel Pipelined Query Execution" by Hirakawa et al.

1986 ACM 0-89791-191-1, pp. 239–250, "Query Processing in Main Memory Database Management Systems", by T. Lehman, et al.

1983 ACM 0362-5915, pp. 15–40, "Operational Characteristics of a Hardware Based Pattern Matcher" by R. Haskin et al.

1982 ACM 0-89791-066-4, pp. 39–47, "The 801 Minicomputer", by G. Radin.

IBM TEchnical Disclosure Bulletin, vol. 20, No. 7, Dec. 1977, entitled "Offset Value Coding" by W. M. Conner.

The Systems Programming Series—"Sorting and Sort Systems", by H. Lorin, Copyright 1975, Lib. Cong. Cat. 73-2140, pp. 59–86.

IBM Technical Disclosure Bulletin, vol. 15, No. 1, Jun. 1972, pp. 297–304, entitled "Arrangment to Speed Up Sort Merge by Using Multiple Compares and Exchanges", by F. Tsui et al.

Patent Abstracts of Japan, vol. 13, No. 448, p. 942, Oct. 9, 1989. Pub. No. JP1173229.

Patent Abstracts of Japan, vol. 14, No. 179, p. 1034, Apr. 10, 1990. Pub No. JP2028878.

Becker et al., "Computer Assisted Prior Art Searching," Journal of the Patent Office Society, vol. 65, No. 10, Oct. 1983, pp. 536–585.

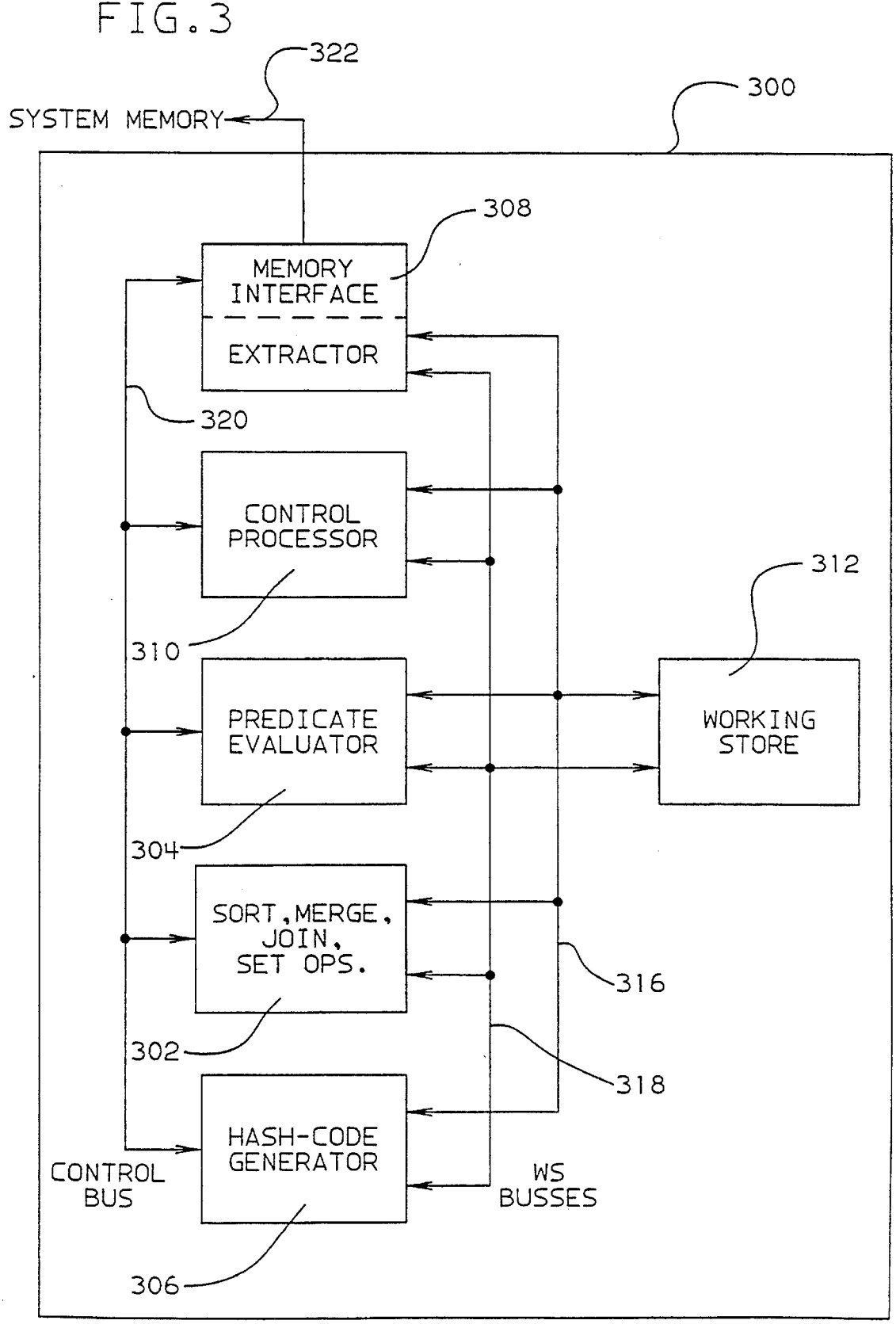

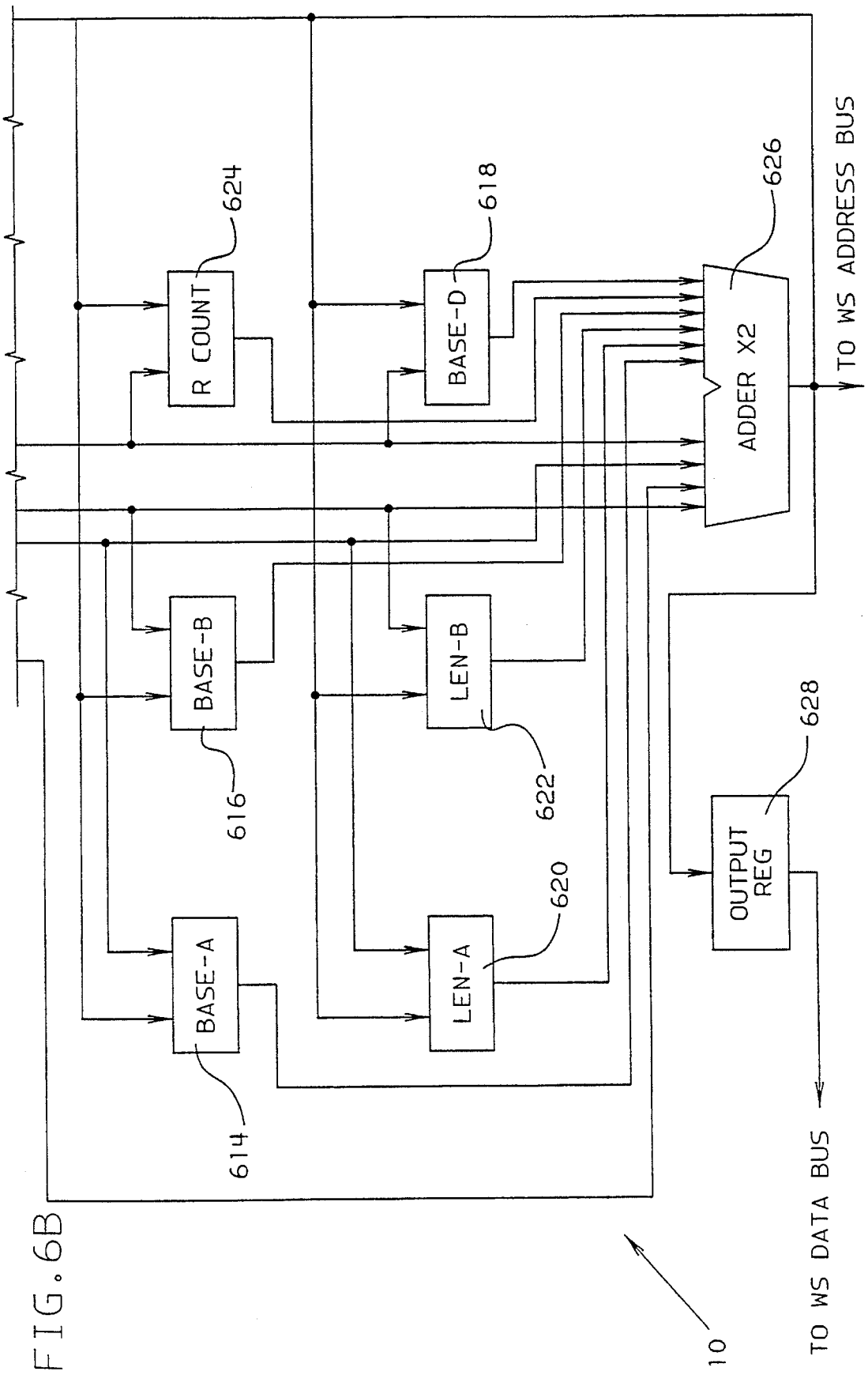

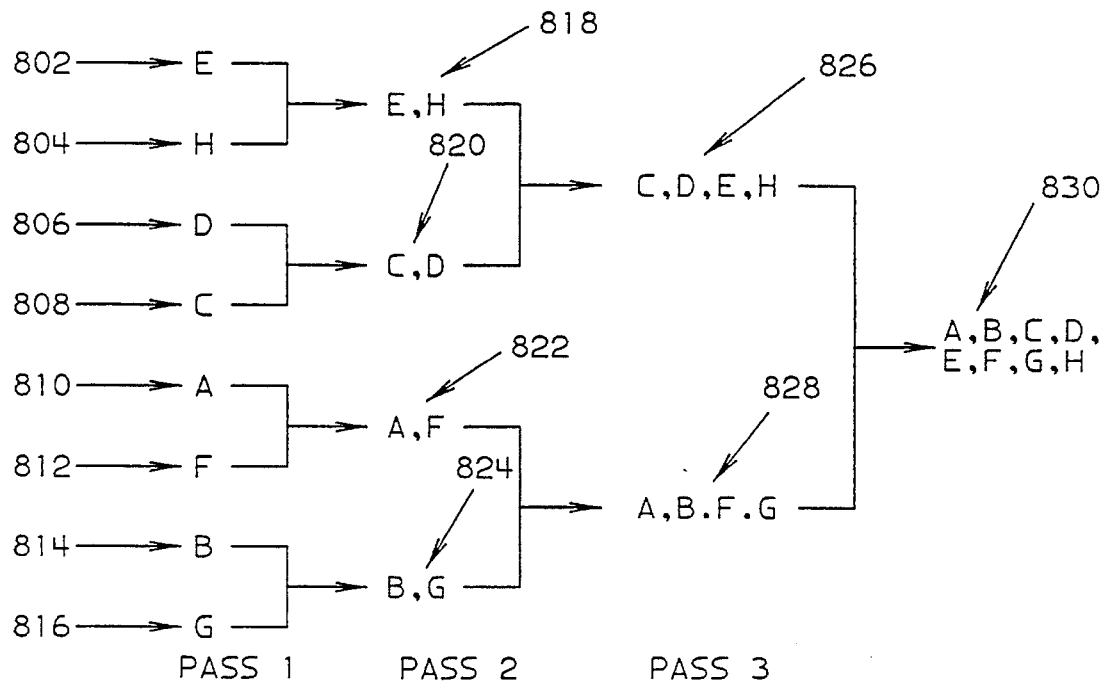

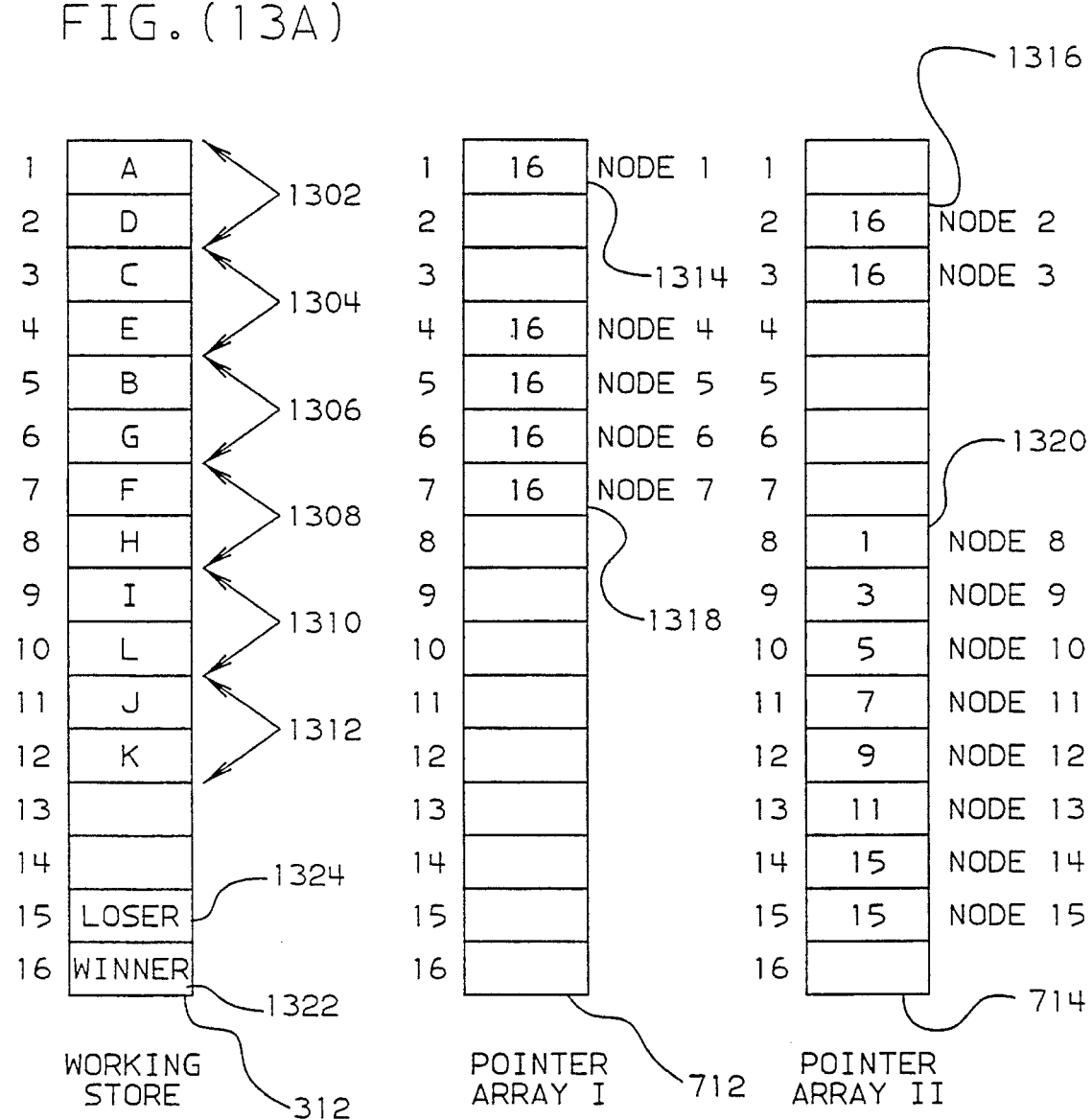
FIG.(13A)

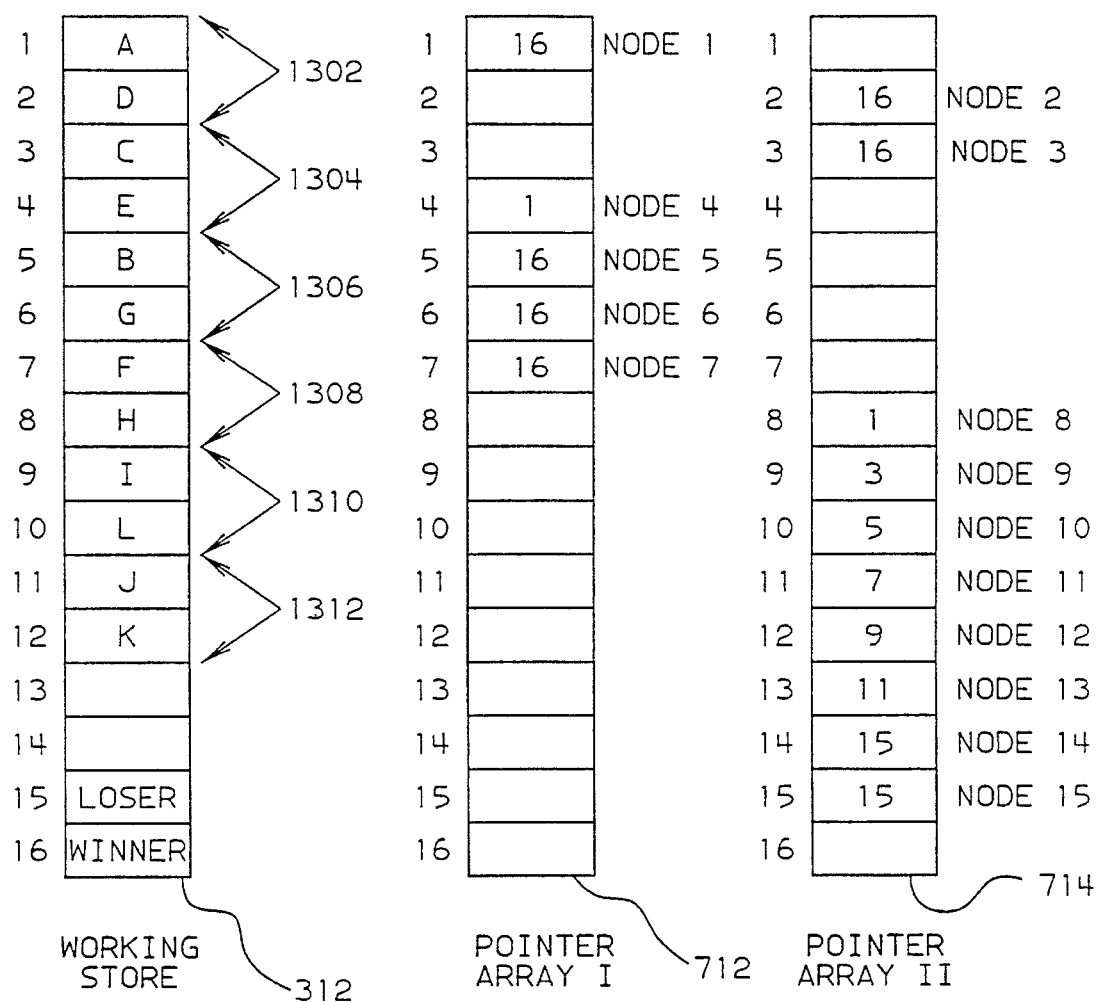
FIG. (13B)

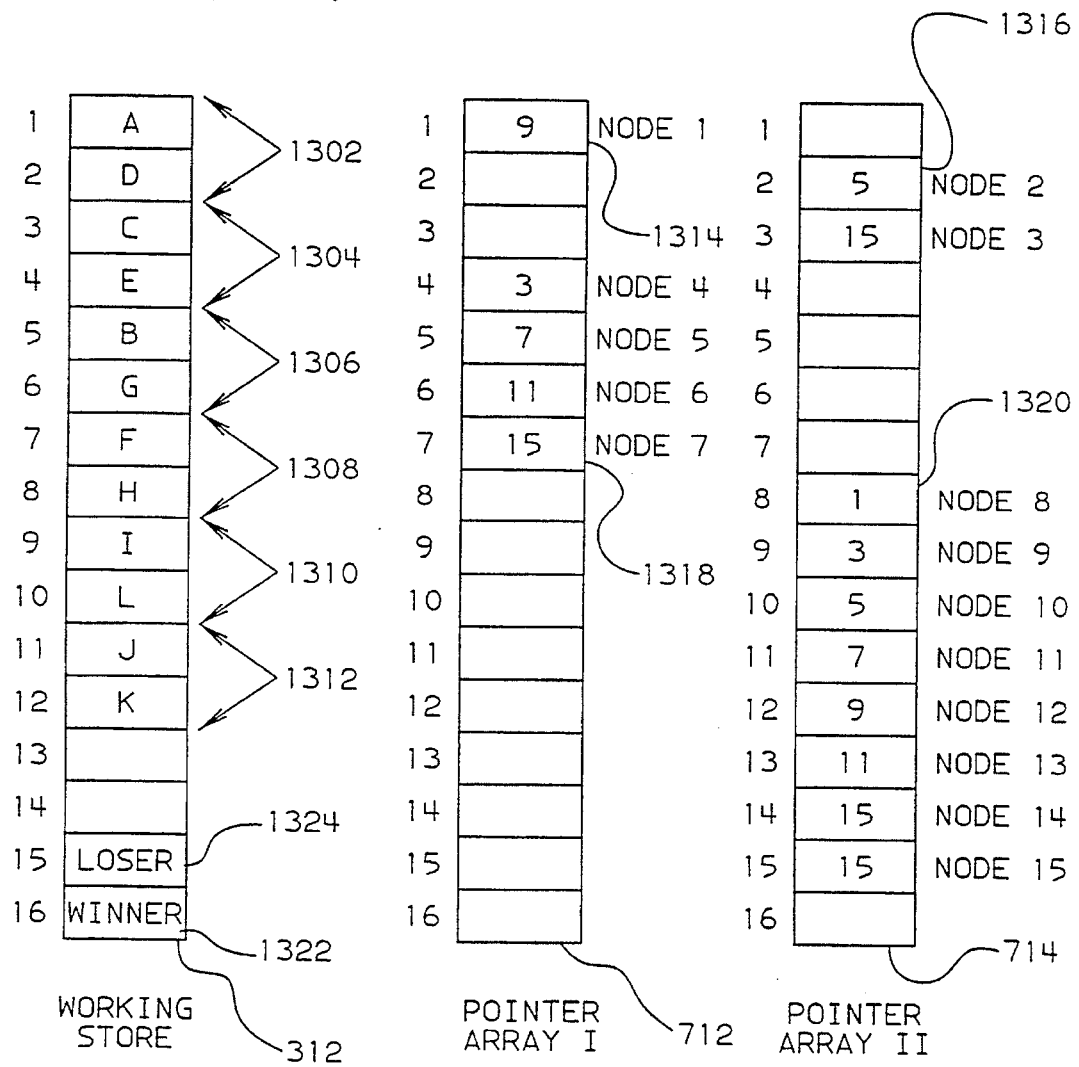

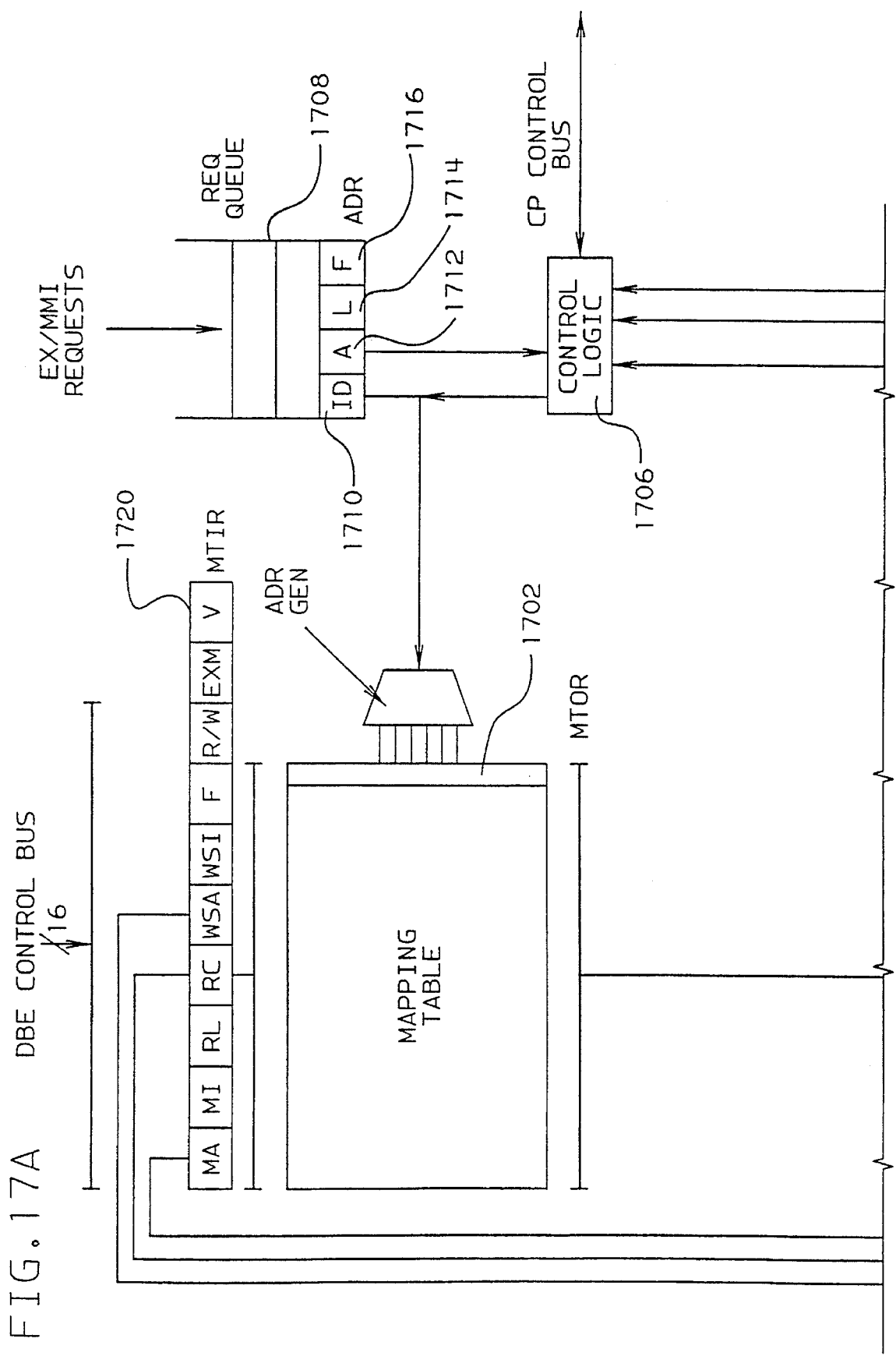

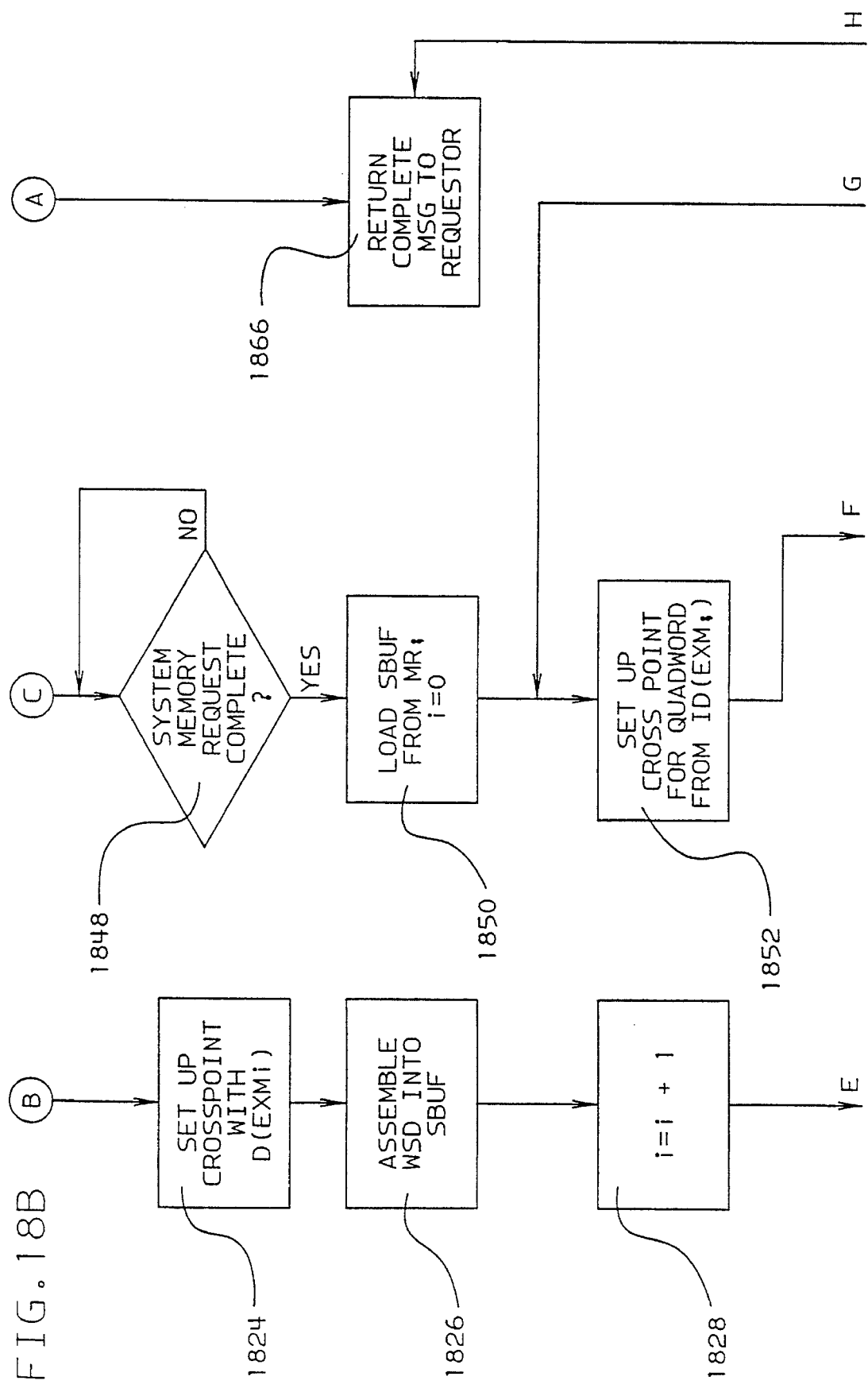

APPARATUS FOR REALIGNING DATABASE FIELDS THROUGH THE USE OF A CROSSPOINT SWITCH

This is a Continuation of application Ser. No. 07/993,270 filed Feb. 11, 1993, now abandoned, which was a Divisional of application Ser. No. 07/499,844 filed Mar. 27, 1990, now U.S. Pat. No. 5,210,870.

I. BACKGROUND OF THE INVENTION

1. Field of the Invention

This invention relates to database processing.

2. Related Art

Database processing is a widely known and commercially significant aspect of the data processing field. A database is a collection of data organized into records. Computer operations which are performed on and/or using these data records are referred to as database processing. A database manager is the package of database processing operations used to access and manipulate the database.

Database processing commonly involves operations such as sorting, merging, searching and joining. Set operations such as union, intersection and difference are also common aspects of database processing. Conventionally, these operations have been performed by software algorithms requiring significant amounts of processor execution time. In large databases, the processor execution time can be prohibitive, significantly degrading the performance of software database managers.

One aspect of database processing involves searching for records that meet a certain criteria. For example, a search might scan all records in the database and return every record that has column "X" equal to some value. In a more complex case, the search might scan and retrieve records based on a predicate equation involving many columns and values. Since the databases can be very large, (e.g. hundreds of millions of records), the searching algorithms used in conventional software database management systems can take hours to process.

Another aspect of database processing involves the extraction of sort keys and search fields from the database records. In sorting and searching applications, the sort key or field on which a search is defined are often spread throughout the records and must be extracted into a useable format before the operation can proceed. For sorting this means getting each key field and concatenating them in precedence order so that they can be treated as one large key. For searching, the columns of a table that are being searched or selected must be extracted from the rows. Conventionally, these and many other database operations can use significant amounts of CPU time.

There have been a number of attempts to provide solutions which "off-load" the CPU of some of the database processing tasks. One such solution was to provide a computer system with a specialized sort processor to handle sorting tasks which would otherwise be executed by the CPU. FIG. 1 is an illustration of a such a prior art sort processor.

The sort processor 100 of FIG. 1 shares a main memory bus 102 with a central processing unit 104. A main memory 106 communicates with the central processing unit 104 through a first set of communications lines 108 and with the sort processor 100 through a second set of communications lines 110. The central processing unit 104 and the sort processor 100 are interconnected by a start control line 112 and and interrupt line 114.

During database processing, random records stored in a peripheral file 116 are transferred to the main memory 106. A control program then initiates the action of the sort processor 100. Under firmware control, the key words are transferred from the main memory 106 to the sort processor 100 and then sorted. The autonomous action of the sort processor 100 results in savings of Central Processing Unit time and simplification and reduction of programming efforts.

While the sort processor 100 of FIG. 1 provided an advance over contemporaneous software database processors, the solution was only partial. Sorting is but one aspect of database processing. Other operations such as searching, joining of tables and set operations also take up significant amounts of CPU time. Further, although the sort processor of FIG. 1 operated relatively autonomously from the remainder of the system, its internal sorting algorithm was implemented in microcode. Thus the sort processor of FIG. 1 was limited by many of the same constraints as sort programs which would otherwise be executed by the CPU.

The sort processor 100 of FIG. 1 is also subject to performance limitations in that it shares the main memory 106 with the central processor 104 on a low priority basis and along a single memory bus 102. The competition for main memory access time along the single bus path (albeit reduced relative to systems having no sort processor) can cause a bottleneck for data traffic between the main memory 106 and the sort processor 100.

Another approach to database processing off-loads some of the database processing tasks traditionally handled by the CPU to a vector processing element. FIG. 2 is an illustration of one such prior art relational data base managing system utilizing a vector processor. A central processor 200 includes a scalar processor 202 and a vector processor 204. Both the vector and scalar processors have access to a main memory 206 and a subsidiary storage 208.

In operation, a database command issued from an application program 210 is examined by a relational database managing program 212. The database managing program 212 identifies the command, analyzes it, and then generates codes which which designate a determined process sequence. During database processing, required data is loaded into a data buffer area 214 in the main memory 206 from a page area in in the subsidiary storage 208. Under control of the process sequence codes, the data in the buffer area 214 is rearranged in the form of a vector structure. The resultant vector data elements are stored in a vector area 216.

When the process sequence codes indicate the processing of the vector data, a sequence of vector instructions are executed by the vector processor 204. Under control of the vector instructions, the vector processor 204 processes the data in the vector area 216 in accordance with the designated processes sequence.

One constraint of the database managing system of FIG. 2 is that as a consequence of its reliance on vector processing, the database must be generated in or converted to a vector format prior to being processed. This conversion process can, in itself, take a significant amount of time and can slow the data base processing operation.

A second constraint of the database managing system of FIG. 2 is that the associated vector processing hardware is programmed at the instruction level (i.e. it is left to the programmer to write the instruction primitives required to perform the database processing functions). These instructions are executed by the vector processing hardware synchronously within the database management program. Thus, the database manager program is dedicated to a single task while the instructions are being executed. Further, as each primitive instruction is executed it requires CPU time. The CPU is, therefore, not completely free of database processing duties until the entire series of primitives is executed.

Yet a third constraint of the database managing system of FIG. 2 is that the vector processing approach adds levels of indirection to the database processing operation. In vector formatted databases, a series of pointers are used to locate the actual data of interest. A location in one table will often point to another location in another table and so on. This indirection can increase processing time of database operations.

II. SUMMARY OF THE INVENTION

It is an object of the invention to exploit functional level parallelism to enhance the overall processing speed of database operations beyond that achieved by prior art database processors.

It is a further object of the invention to process database operations at or near system memory bandwidth speeds.

It is a further object of this invention to process, in an attached coprocessor environment, a command list generated by a conventional software database processing program.

In accordance with these objectives, the inventors have provided a Database Engine (DBE), which provides fast processing for basic database functions. In the preferred embodiment, the Database Engine includes an extractor/memory interface unit which provides access to a system memory and extracts the data to be processed therefrom, a local working memory which temporarily stores the data to be processed, a plurality of autonomous processing elements which each perform a specialized database processing function, and a control processor which parses database commands from a database manager into subfunctions and distributes the subfunctions among the processing elements.

By providing hardware to assist and accelerate the processing of basic database functions, the Database Engine can significantly reduce the execution time of many database operations.

Advantageously, the Database Engine overcomes many of the constraints of prior art database coprocessors. In contrast to the system of FIG. 2, the Database Engine does not require vector formatted records. Thus, the database engine eliminates much of the processing overhead present in the FIG. 2 system. Further, unlike the vector processor of FIG. 2, the Database Engine can be controlled with macro commands rather than requiring central processor instruction level programming.

Unlike the system of FIG. 1, the Database Engine does not need to compete with the CPU for main memory access time by way of a common data bus. In one embodiment, the database engine is coupled to the systems page storage. The page storage acts as a directly addressable main memory for the database engine but appears only as a paging memory to the system's central processors. This enables large databases to be fixed in the paging memory and minimizes competition with the central processors for main memory accesses.

III. BRIEF DESCRIPTION OF THE DRAWINGS

FIG. 3 is a block diagram overview of the Database Engine according to a preferred embodiment of the present invention.

FIGS. 6A and 6B are, respectively, top and bottom halves of a diagram illustrating an embodiment of the Predicate Evaluator (DBPE) of FIG. 1.

FIG. 8 is an example of a block sort.

FIG. 9 is an illustration of the state of the Working Store and pointer arrays during a block sort using the sort/merge unit of FIG. 7.

FIGS. 13A–13C illustrate progressive states of a tournament tree implemented in the Working Store and pointer arrays of FIG. 7.

FIGS. 17A, 17B are, respectively, top and bottom halves of a more detailed diagram illustrating the structure of the Extractor/Memory Interface Unit (DBEM) of FIGS. 3 and 16.

FIGS. 18A, 18B and 18C are a flowchart of the operation of the DBEM of FIGS. 17A, 17B.

Like elements which appear in more than one figure have been assigned like reference numerals.

Figure 1:
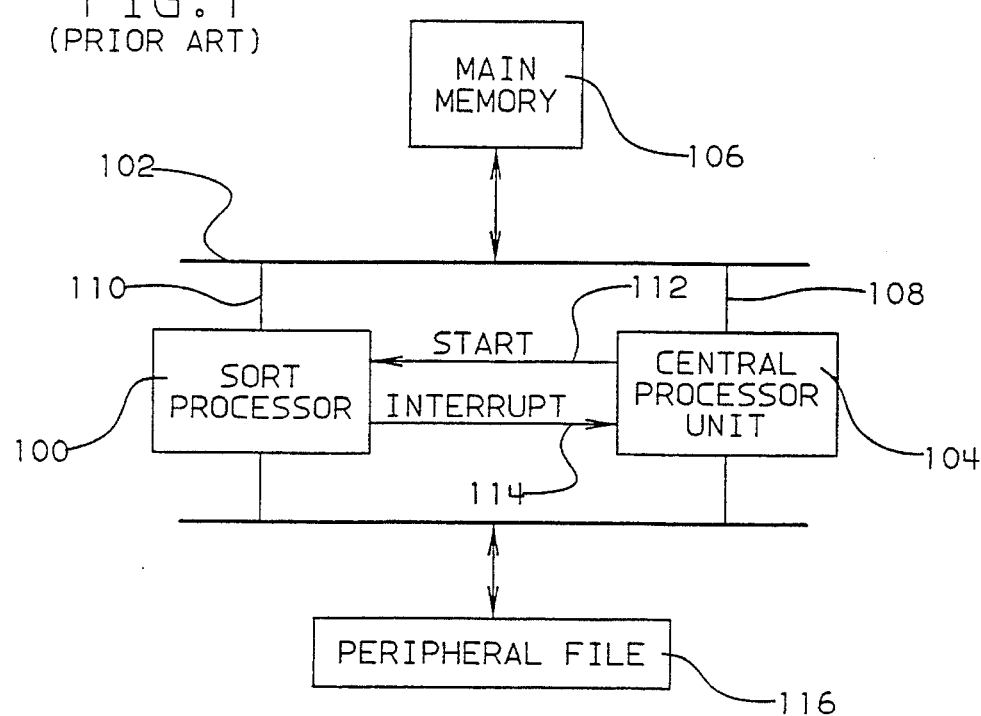
FIG. 1 is diagram of a prior art sort processor system.

IV. DESCRIPTION OF THE PREFERRED EMBODIMENTS a. Database Engine

The Database Engine (DBE) is a special purpose processor designed to quickly evaluate relational databases and provide fast sorting of data. The Database Engine performs the core functions required for database processing including sorting, merging, joining, searching, and manipulating fields. The Database Engine provides performance improvements over many of the best known software approaches to the same problems by taking advantage of the overlap between processing and memory access time that can be obtained in a specialized hardware implementation.

The overall structure of the Database Engine is illustrated in FIG. 3. The Database Engine 300 comprises five hardware processing elements (designated by reference numerals 302–310) and a Working Store 312. Two internal multibit data busses 316,318 provide data flow between the Working Store 312 and the processing elements 302–310. An internal multibit control bus 320 provides a control data path between the processing elements. Externally, a system memory bus 322 is provided between an extractor/memory interface unit 308 and the system memory (not shown in FIG. 3).

The processing elements 302–310 and the Working Store 312 work in concert to process database queries. The Sort/Merge unit 302 performs sorts, merges, joins, and set operations. Searching is performed by the Predicate Evaluator 304. A hardware Hash-Code Generator 306 is provided to improve the performance of EQUIJOINs on two databases. Record field extraction and memory access functions are performed by the Extractor/Memory Interface Unit 308. Operations performed by the foregoing processing elements are initiated under the control of the Control Processor 310.

The Database Engine 300 works in conjunction with database application software running on a host system. An example of such software is DB2 (an IBM database application program that runs under MVS.) The application software does all of the I/O required to read the database into system memory. The application software also creates the Database Engine commands, the database object descriptors, and the predicate; then puts them into the system memory where they can be accessed by the Database Engine 300.

Figure 4:
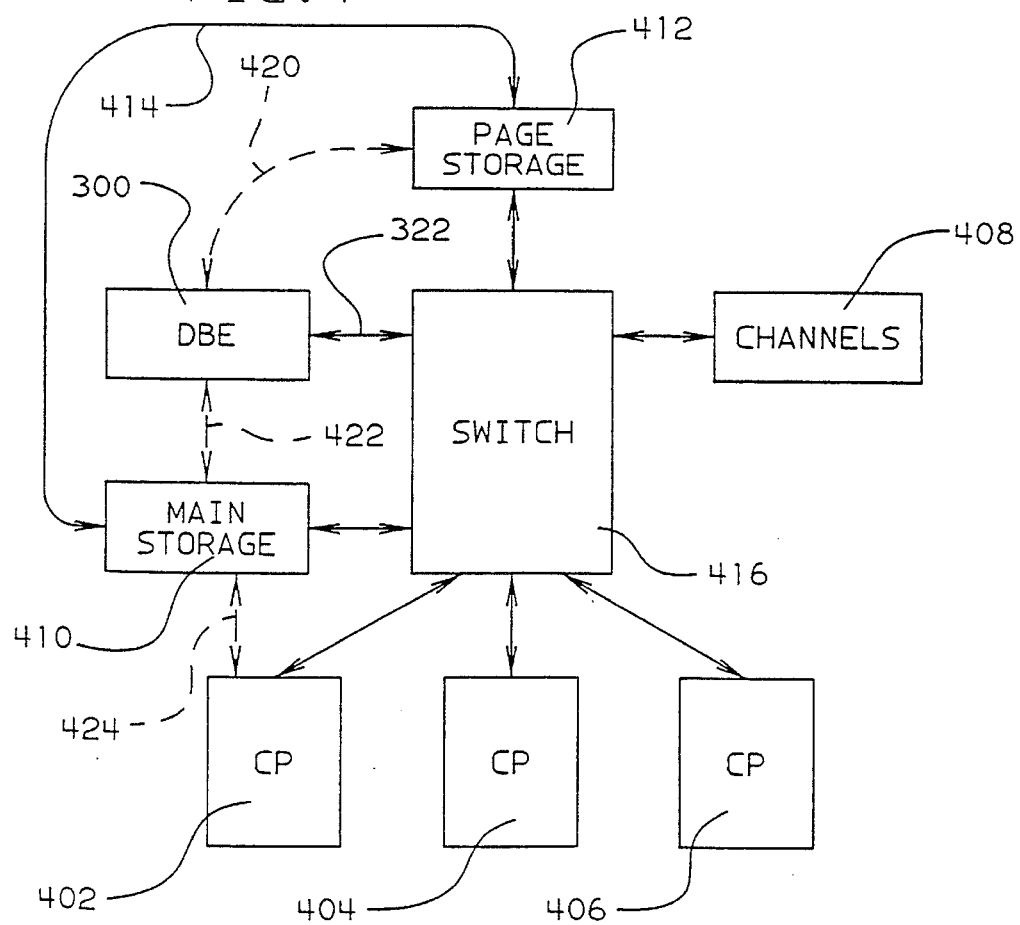
FIG. 4 is a block diagram illustration of the logical connection of the Database Engine of FIG. 3 into a computer system having a paging memory and a main memory.
Figure 2:
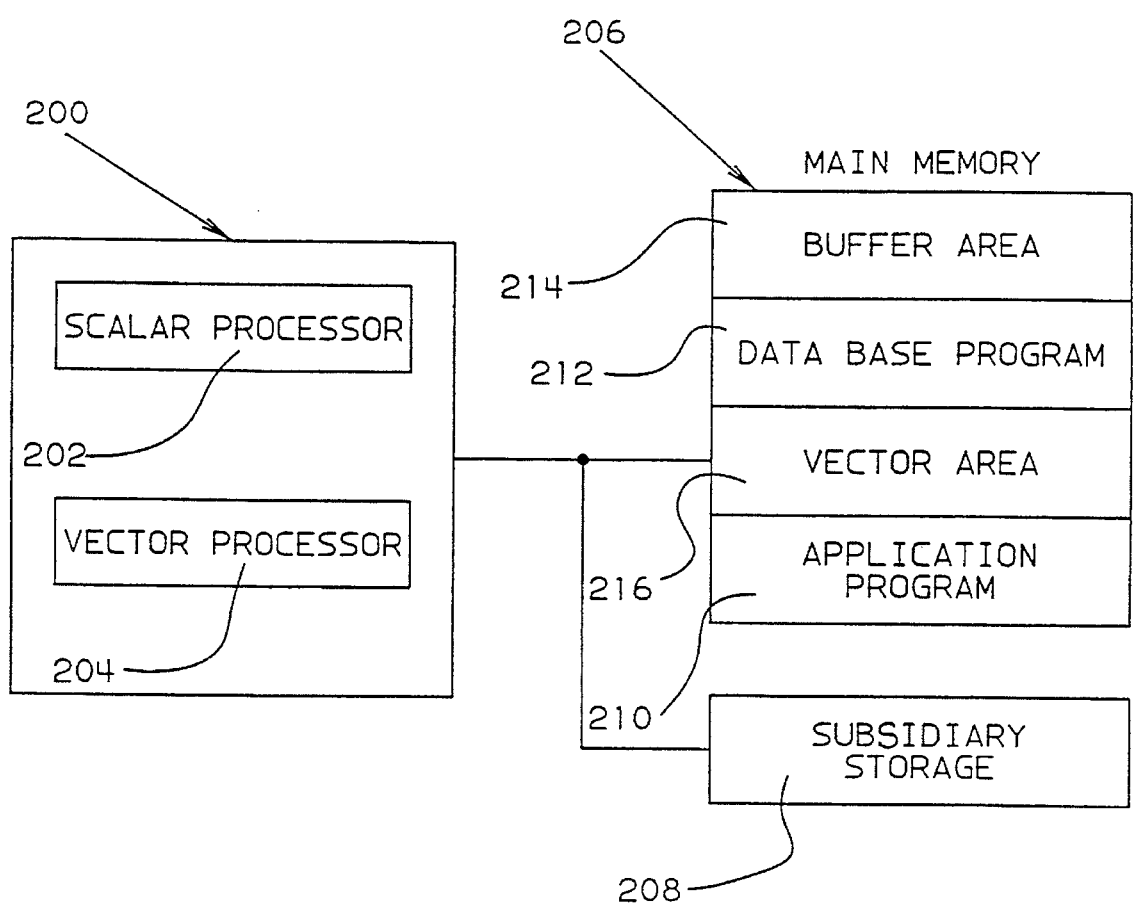
FIG. 2 is a diagram of a prior art database managing system.

FIG. 4 illustrates the system attachment of the Database Engine 300 in a exemplary system environment. In the system of FIG. 4, the Database Engine 300 is shown configured in a multiprocessor system having three central processors (CPs) 402–406, I/O channels 408, and a system memory comprising a main storage 410 and a page storage 412. The page storage acts as a paging memory to the central processors 402–406. Pages of data are transferred from the page storage to the main storage, under control of the central processors 402–406, by way of a memory data bus 414. The central processors then access the data in main storage by way of a switch or system controller 416. An example of such a system is described in U.S. Pat. Nos. 4,476,524 to Brown and 4,394,731 to Flusche et al., which are both incorporated by reference in their entireties, as if printed in full below.

The switch 416 is of the self routing, non-blocking crossbar type. Specifically, the switch 416 provides simultaneous multibit data paths between the main storage 410 and any one of the system elements (300, 402–408), and between the page storage 412 and any other one of the system elements. For example, the switch 416 can provide a first data path between the page storage 412 and the Database Engine 300 while at the same time providing a second data path between one of the central processors 402–406 and the main storage 410.

Alternatively, the system memory (main and page storages 410, 412) can be multi-ported and data transfer between the Database Engine 300 and the system memory (410, 412) can be provided by directly connected high bandwidth buses 420, 422. Further, the central processors can be provided with access the main storage through a port or ports by way of a CP data busses such as the one shown by reference numeral 424. A similar connection could be provided for the between the system memory and the I/O channels 408. In such an embodiment the switch 416 can be eliminated.

The configuration of FIG. 4 enables the Database Engine 300 to access system memory (410, 412) directly, without having to go through the central processor to generate requests. Thus, the Database Engine can access the page storage 412 as a main memory. As described above, in the system of FIG. 4 the page storage acts 412 as a paging memory to the CPs 402–406. This attachment system/method enables the Database Engine to run as a logically asynchronous processor in the system with minimal effect on the CPs.

Having direct access to both the main and page storages 410, 412 provides a number of ways for the database engine to access commands and data records. For example, the database can be accessed from the main storage and portions can be paged in as needed. Alternatively, the database can be fixed in the page storage 412 and accessed directly, thus avoiding the I/O costs entailed with saving and restoring the database to a direct access storage device (DASD). In any event, performance requirements, memory size, and the type of memory available in a particular system are factors which should be taken into account in determining where the database should reside in the system memory.

With respect to the system environment of FIG. 4, data that is needed by the Database Engine 300 is fixed in the system memory (either the main storage 410 or the page storage 412) by the operating system prior to issuing the start signal. A list of page or record addresses is then given to the Database Engine to tell it where in the system memory (410, 412) the data resides and in what order to access each fixed block.

A Database Engine operation is initiated via a command sequence that is constructed by the database application program. The command sequence is placed in the system memory through the operating system prior to invoking the operation of the Database Engine. Once the Database Engine 300 has been started, it runs asynchronously, accessing the commands, descriptors, and data (out of system memory) as it needs to without any interruption of the central processors 402–406. When the operation is complete, an interrupt is issued back to the calling program The operation of the Database Engine 300 will now be explained in more detail by example of the processing of a search with sort command. Reference will be made to FIGS. 3 and 4. Through the receipt of a start signal, the Control Processor 310 is signaled that a database command, encountered by the host CPU, exists in the system memory. The start signalling is done through the memory interface portion of the Extractor/Memory Interface Unit 308 and includes the address of a database command block (described in detail elsewhere) in the system memory. On receiving the Start DBE signal, the Control Processor 310 fetches the database command block from the system memory and stores it internally.

Next, the Control Processor 310 parses the database command information into setup and processing information for each of the other processing elements 304–308. The database descriptor and field information is used to initialize the extractor/assembler function of the Extractor/Memory Interface Unit 308, the selection predicate is loaded into instruction and constant tables within Predicate Evaluator 304, and the sort key is used to set up the Sort/Merge unit 302. Once each processing element is loaded with its required information (function and initialization data), the execution phase begins.

The database command is executed by processing blocks of data through each processing element in a pipelined fashion until the entire database has been processed. In the case of a search with a sort, the data is first processed by the extractor portion of the Extractor/Memory Interface Unit 308 to put the needed data into the Working store 312. Next, the Predicate Evaluator 304 processes the records in Working Store 312 to select ones which meet the selection predicate. The Sort/Merge unit 302 then sorts the selected records into order based on the key.

The sorting and predicate evaluation operations are performed in blocks of the size of the Working Store 312 and are repeated until the entire database has been processed. The sort portion of the command, for example, may take several merge passes to be able to merge a large database. In such a case, an assembler function of the Extractor/Memory Interface Unit 308 is used to write intermediate results to a temporary memory area in the system memory. On the final merge pass, the output records are assembled into their correct format and written to an output memory area (designated by the command), by the assembler function of the Extractor/Memory Interface Unit 308.

Once the last record is assembled and placed into the system memory, the Control Processor 310 collects any operational or error status and places it in a status area in the system memory. The Control Processor 310 then signals the initiating host CPU that the operation is complete. The Database Engine 300 is then ready to process another command.

Advantageously, the Database Engine's System memory accesses can be overlapped with database processing time. Database records can be assembled by the Database Engine 300 and returned to system memory while still other records are in the midst of being processed. Further, once started by the Control Processor 310, each of the other processing elements 304–308 can operate in parallel, as long as the function can be partitioned to allow simultaneous access to the Working Store partitions. Thus the Database Engine can execute database queries at very close to the system memory access rate.

Although the above example describes a search with sort execution, it should be understood that the Database Engine can perform many different operations, including search, sort, merge, join, etc., which all execute in the same datablock pipelined fashion.

The Database Engine command set includes the core relational database functions that are used to process database queries. These functions are the basic components of the queries, and can be chained together to produce a complex database query. The core functions implemented by the Database Engine are:

1. Sorting. A database is sorted based on a given column or combination of columns and returned in sorted order. The sort key can be any length (up to 32K bytes long in the preferred embodiment).

2. Searching. The database is evaluated and the results are restricted to rows that match a given predicate, e.g., find all records where column 1='xyz' is a search operation. A subset of the full database is returned in which all records have column 1 equal to 'xyz'. The "column 1='xyz'" is called the predicate and can be simple (as in this case) or complex. The Database Engine allows the following comparison operators to be used: "equal", "greater than or equal", "less than or equal", "not equal", "less than" and "greater than". Complex predicates are composed of simple predicates connected with AND, OR, and NOT and other Boolean operators.

3. Selection. A subset of the columns in the database can be chosen from the database and returned by the selection operation. The selection operation returns a vertical subset of the database columns.

4. Set Operations. The set operators include union, intersection, difference, and cross product. These are performed as defined for general set theory.

5. Join Operations. Join operations are performed according to the type of join. The join operator can be "equal", "greater than or equal", "less than or equal", "not equal", "less than" and "greater than" or combinations of the above connected by the Boolean operators AND, OR, and NOT. Note that outer joins can be performed as well, although they create large resultant databases.

b. Command Format

The command block is a data structure that provides both command and address information to the Database Engine. The command block is constructed by the database application software and passed to the Database Engine 300, during initialization, by Way of the system memory. The Database Engine 300 is informed that the command block is present in the system memory through receipt of the Start DBE command. The command block contains the following information.

1. The type of command that is to be executed: sort, merge, join, selection, search, union, intersection, difference, cross product, or division.

2. The address of the database descriptor(s) in memory. There can be up to three database descriptors used, two inputs and an output. The output area is also used as the temporary work area during processing.

3. The address of the predicate to be used during command processing.

4. The fields from the databases that are to be used for the command and the output fields to be given.

5. If an index is available, it can also be specified in the command block.

The database descriptor is used by various commands to identify a particular database. For example, the MERGE command can have any number of databases (up to 128 in the preferred embodiment) as inputs and one database as an output. Each of the remaining commands preferably processes one or two databases as inputs and have a third as an output. Each of these databases are identified to the Database Engine by a database descriptor. Each descriptor contains the following information:

A. Starting address of the database.

B. The format of the database, either DB2 or compact. The Database Engine can process the DB2 pageset format for any of the nonindex commands, however, improved performance will result if the Database Engine uses a compact sequential format instead. All workspace and temporary databases used by the Database Engine are stored with records placed sequentially in memory. The final result can be stored in either format.

C. The number of records in the database.

D. The format of the database, i.e., the number of fields, the type of data contained in the fields, and the maximum length.

As discussed above, the address of the predicate to be used during command processing is passed to the Database Engine as part of the command block. The predicate is the Boolean equation which restricts the output records to a subset of the original database. It can be just one term or many and will preferably be expressed in a Reverse-Polish notation to allow the Database Engine to process it more quickly. The Reverse-Polish notation removes any parentheses that exist in the original SQL query, allowing the query to be processed sequentially using a stack processor. For example, the following is a query in SQL:

```
Select POSITION,MANAGER from EMPLOYEES
    where AGE < '    25'
    and LOCATION = 'TRENTON'
    and VACATION < '    10'
    and GRADE < '    85';
```

The where clause is the predicate and can be converted to the following Reverse-Polish form:

```
        AGE,'    25',<,
        LOCATION, 'TRENTON',=&
        VACATION,'    10',< &,
        GRADE,'    85',< &
```

It is the responsibility of the calling procedure to convert the SQL query to this format before initiating the Database Engine operation. It is also the responsibility of the calling program to replace the English language names with the database and field number associated with each before giving the predicate to the Database Engine.

The Database Engine can evaluate predicates on either character or integer fields. Allowable arithmetic operations are equal, less than, greater than, less than or equal, greater than or equal, and not equal. These comparisons can be combined into more complex queries by using the Boolean operators OR, AND, and NOT. Any combination or integer or character comparisons can be made with the above operators.

c. Processing Elements

As has been previously described, the five Database Engine elements work in concert to solve the problems at hand, taking advantage of the overlap and pipelining of functions where possible. Again, by reference to FIG. 3 they are:

1. Control Processor (DBCP) 310;
2. Working Store 312;
3. Predicate Evaluator (DBPE) 304;
4. Sort/Merge Unit (DBSM) 302;
5. Hash-code Generator (DBHG) 306; and,
6. Extractor/Memory Interface Unit (DBEM) 308.

d. The Control Processor

The Control Processor 310 (FIG. 3) is the only element which communicates with the application and operating system programs that use the Database Engine. It is the function of the Control Processor 310 to obtain all of the command and database information from memory, schedule and control each of the other Database Engine elements, and to communicate status back to the calling programs. The complexity of these functions requires a processor capable of computing addresses and control information in parallel with the rest of the Database Engine.

The Control Processor 310 is preferably implemented using an an 801 processor plus extensions for the Database Engine functions. It should be understood that other conventional processor architectures could be used to perform the required processing functions, as long as they are provided with interfaces to the Working Store buses 316, 318, the control bus 320 and the computer system to which the Database Engine is attached.

The Control Processor 310 performs all of the command processing and control functions in the Database Engine. These functions include the setup and control of each functional element, as well as the determination of how the command is best processed. The following is a list of the functions that are performed by the Control Processor 310:

1. Reading the Database Engine command blocks from the system memory to determine what functions are to be performed. Each command and the data descriptor(s) associated with it is converted into a processing sequence to be performed. For example, a sort command is executed by scheduling the loading of blocks of the database into the Working Store 312, having the sort/merge unit 302 sort each block until the entire data base has been sorted into many blocks, having the sort/merge unit 302 perform a merge of these blocks to create the final output records, and then having the Extractor/Memory Interface Unit 308 write these records to the system memory.

2. Fetching and evaluating the data descriptors to determine the format of the data, how it should be accessed by the Extractor/Memory Interface Unit and in what order the columns should be extracted into the Working Store 312.

3. Fetching the predicate for each command and converting it into a program which the Predicate Evaluator will execute. The conversion comprises converting column numbers to corresponding Working Store offsets (where the data is to be loaded by the extractor) and computing the next instruction fields of each instruction. After creating the Predicate Evaluator program, the Predicate Evaluator instruction and constant tables are loaded via the control bus 320.

4. Coordinating all of the other elements in the system. To perform this function, the Control Processor 310 uses the control bus 320 to write to the control registers in the other processing elements, to initiate processing, and to read the status of any of the processing elements. Each processing element can be controlled directly by the Control Processor 310 through the control bus 320. All communication between processing elements of the Database Engine is sent over the control bus 320. The Control Processor 310 runs in parallel with the other processing elements 302–308. This enables the control processor to perform processing in the background while the other elements are processing their data. The Control Processor 310 intervenes only when an element needs a new block of data to process or has an error.

Figure 5A:
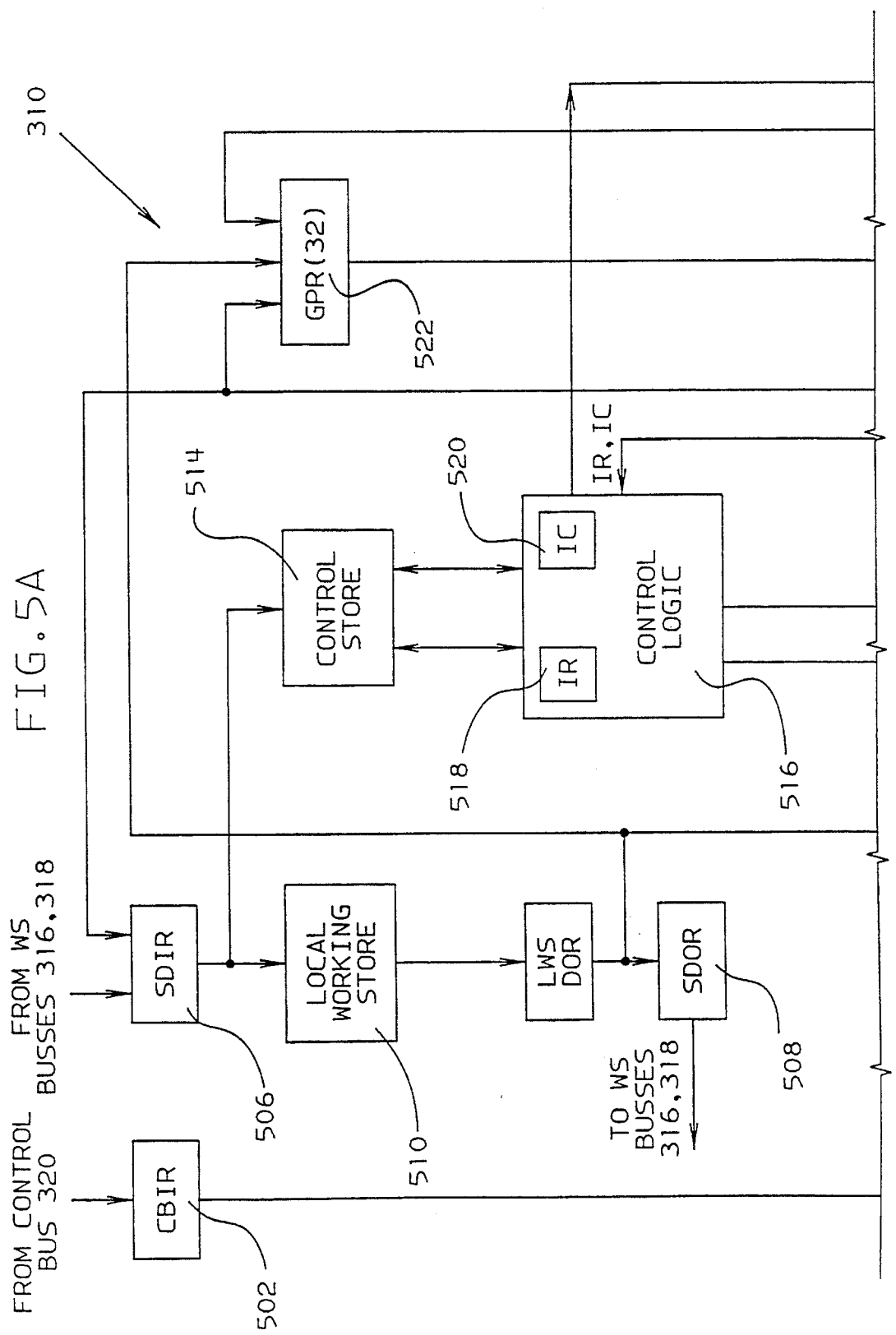
FIGS. 5A and 5B are, respectively, top and bottom halves of a diagram illustrating an embodiment of the Control Processor of FIG. 3.

The functions of the Control Processor 310 can be performed without interfering with the rest of the Database Engine processing elements since the Control Processor 310 maintains all of the information it needs for processing in an internal local working store 510 (FIG. 5A). The local Working Store 510 provides the space required to maintain all of the address and command data. Thus, once the command information is read, there is no further interaction with the system memory by the Control Processor 310.

The hardware structure of the Control Processor 310 is illustrated in FIGS. 5A/5B. The Control Processor 310 is designed around an 801 processor with a 64K byte microstore and a 32K byte local working store. Only a subset of the 801 instructions need be implemented since all (for example, floating point) are not applicable to the Database Engine function. The Control Processor hardware includes the signalling and maintenance interfaces to the rest of the system for the entire Database Engine.

Figure 5B:
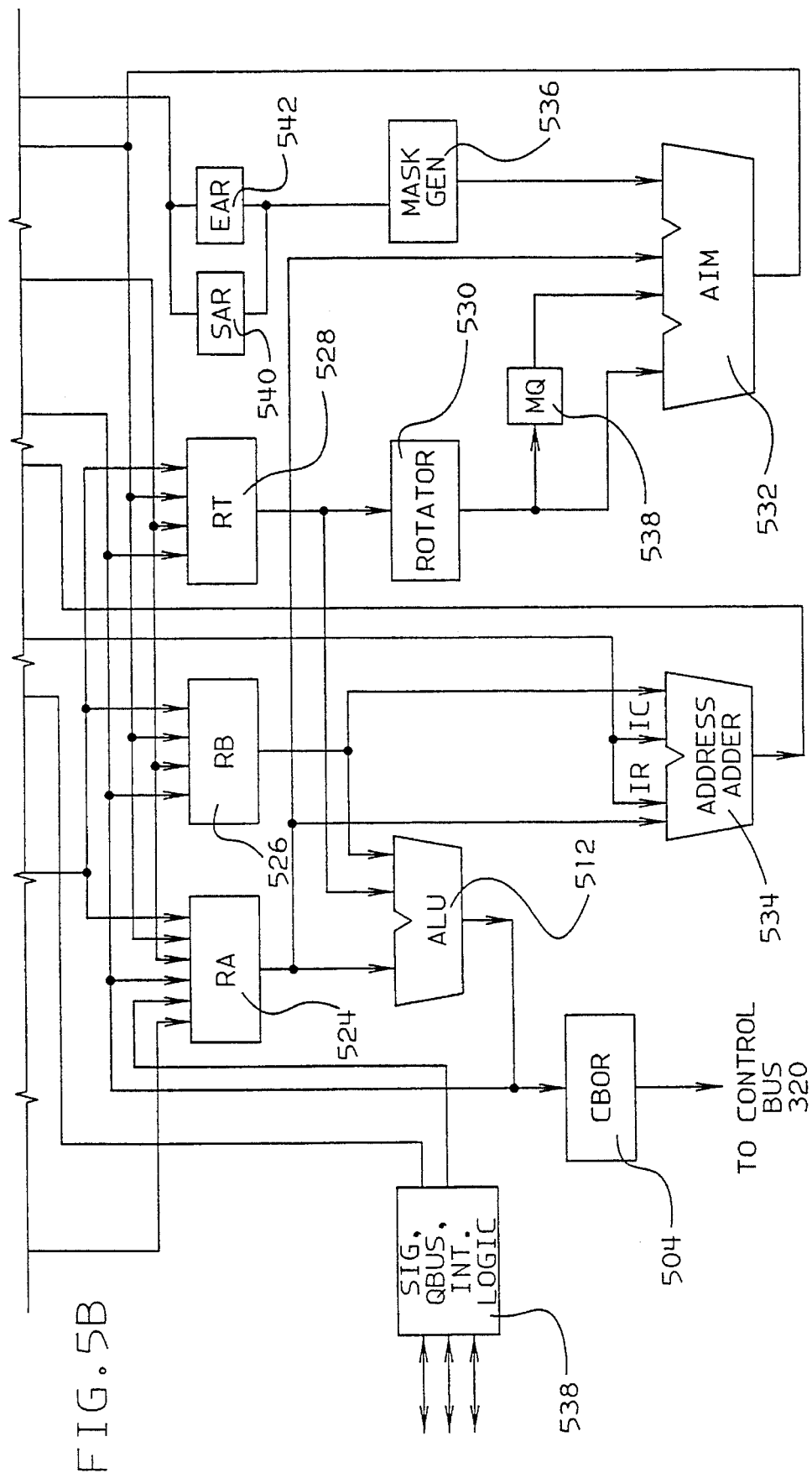

Turning now to FIGS. 5A and 5B, a Control Processor embodied using conventional 801 architecture (less the floating point logic) is illustrated. The Control Processor 310 includes a control bus input register (CBIR) 502 which buffers data read from the control bus 320 to the Control Processor 310, and a control bus output register (CBOR) 504, which buffers data written to the control bus 320 from the Control Processor 310. The Control Processor 310 is also provided with a storage data input register (SDIR) 306 and a storage data output register (SDOR) 508. The storage data input register 506 and the storage data output register 508 form the read and write buffers for the Working Store busses 316, 318. The storage data input register 506 buffers data read from the Working Store 312 to the Control Processor 310. The storage data output register 508 buffers data written from the Control Processor 310 to the Working Store 312.

Internal storage for execution of operations and Control Processor data is provided by a local working store (LWS) 510. Data for the local working store 510 is provided from any of the Working Store 312 or the Control Processor arithmetic logic unit 512 via the storage data input register 506. A control store 514 contains the control program that is executed by the control logic 516.

The control logic 516 provides sequencing and control for the Control Processor 310. The control logic 516 is a conventional microsequencer which includes an instruction register (IR) 518 and an instruction counter (IC) 520. The instruction register 518 holds the currently executing instruction while the instruction counter 520 holds the address of the currently executing instruction.

The control processor includes 32 general purpose registers (GPR) 522 for storage of operands and program data. In addition, three temporary source registers 524–528 are provided for storing the operands of the currently executing instructions. The first temporary source register (RA) 524 is provided to temporarily store the first operand of the currently executing instruction. The second temporary source register (RB) 526 is provided to temporarily store the second operand of the currently executing instruction. The third temporary source register (RT) 528 is provided to temporarily store the second operand of the currently executing instruction as an input to the rotator 530 and And-Invert-Mask unit (AIM) 532. The third temporary source register (RT) 328 also holds partial results for the multiply and other operations.

The arithmetic logic unit (ALU) 512 performs arithmetic and logical operations on the operands in the RA and RB registers 524, 526 under control of the control logic 516. The address adder 534 receives the operands from the RA and RB registers 524, 526, the current instruction for the instruction register 518, the current instruction address from the instruction counter 520 and performs the address arithmetic for branching instructions.

The rotator 530 is a barrel shifter for shifting the contents of the RT register 528 right or left. The shifted result can be ANDed with the output of the mask generator 536 by the And-Invert-Mask unit 532.

The mask generator 536 receives its input from a starting address register (SAR) 540 and an ending address register (EAR) 542. The SAR 540 and EAR 542 hold, respectively, the starting and ending bit address for the mask generator 536, as supplied by the control logic 516.

The And-Invert-Mask unit (AIM) 532 performs rotating and masking operations on the contents of the RT register 528. One of the four inputs to the AIM 532 is the multiply quotient (MQ) register 538. The MQ register 538 holds the partial product for the 801 engine's multiply step instruction and is an operand for shift, rotate and store instructions.

The SIG, QBUS, INTRPT logic 538 provides the interface to the computer system. It is through the SIG, QBUS, INTRPT logic 538 that the computer system starts and terminates the operations of the Database Engine.

It should be understood that the above-described components are embodied in a conventional 801 engine. The paths to the Working Store busses 316, 318 and the control bus 320 have been added. The interface to the the computer system is of the conventional type embodied in the 801 engine. The 801 engine is described in more detail in the article *THE 801 MINICOMPUTER,* author: George Radin, 1982 ACM 0-89791-066-4 82/03/0039, which is incorporated by reference herein, in its entirety.

e. The Working Store

The Working Store 312 (FIG. 3) preferably comprises at least 128K bytes of memory that is used to hold data while it is being processed by the Database Engine. The Working Store 312 is simultaneously accessible as two equal partitions via two quadword (16 byte) busses 316, 318. Read and write both take one cycle, thus the Working Store 312 is capable of 2 quadword accesses (read or write) per cycle. It should be understood that 128K bytes is the minimum preferable size. A larger size Working Store is even more preferable as cost and design constraints permit. Less preferably, smaller amounts of memory could be provided.

The Working Store 312 is directly addressable by all elements of the Database Engine system using the two quadword busses 316, 318. Each bus has 16 bytes of data plus parity and 16 bits of address and control signals. Thus each bus is 176 lines for a total of 352 lines.

f. Predicate Evaluator

Figure 6A:
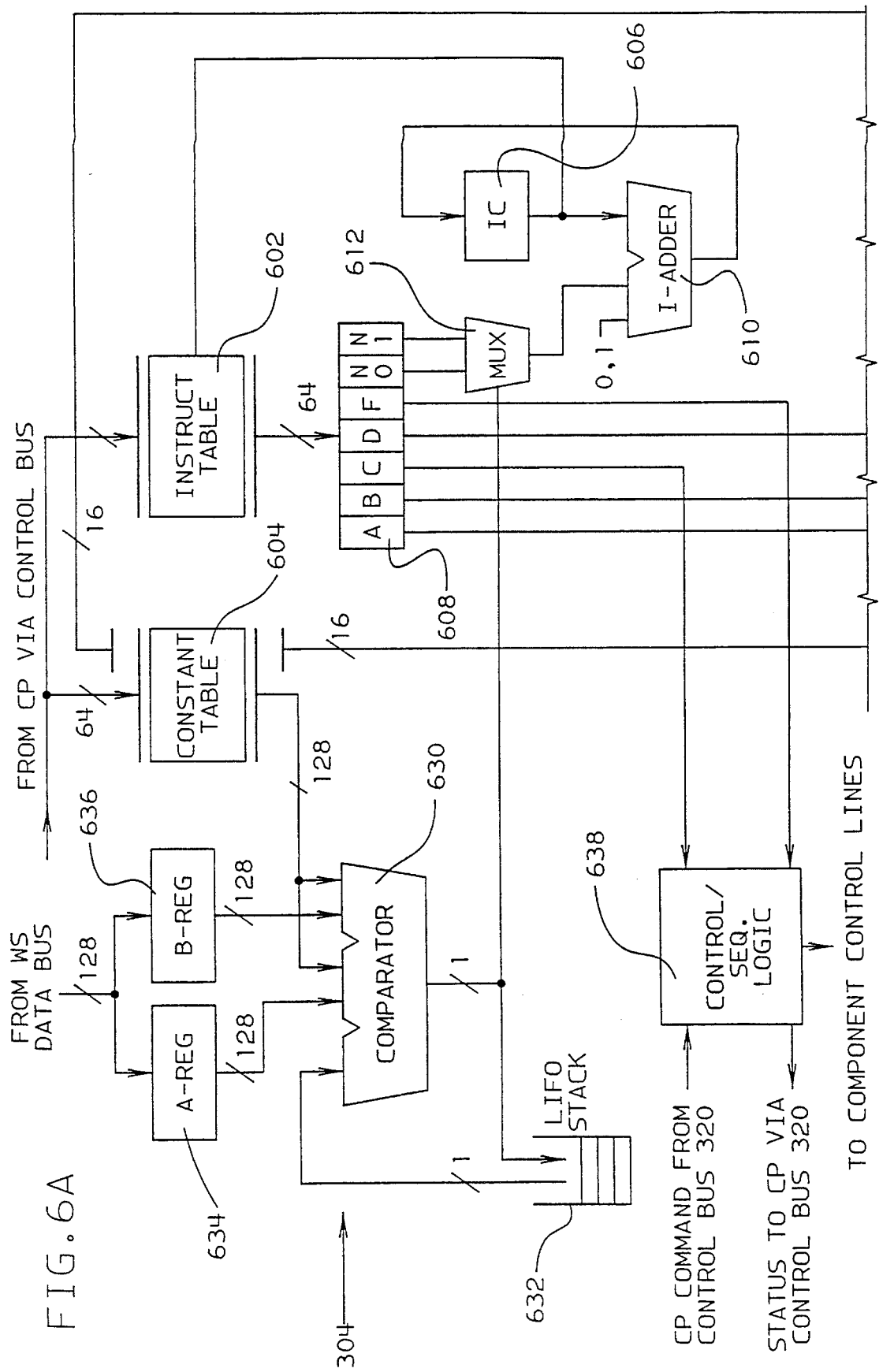

The structure and operation of the Predicate Evaluator (DBPE) 304 will now be discussed with reference to FIGS. 3 and 6A/6B. The Predicate Evaluator 304 is a special purpose processing element that can perform a comparison of two quadwords (16-byte) of data in the Working Store 312 in two cycles or a comparison of a constant and a quadword of Working Store 312 in one cycle. The Predicate Evaluator 304 is a stack processor in that uses a boolean stack to process the reverse polish predicates that are created by the Control Processor 310. Instructions are loaded into an instruction table 602 by the Control Processor 310 via the control bus 320. The Predicate Evaluator 304 executes the instructions in a looping fashion until its count of records is exhausted.

The Predicate Evaluator 304 provides fast processing of search and join queries for several reasons. It can compare a two quadword operands from the Working Store 312 every two cycles. Search keys longer than a quadword are compared a quadword at a time. Further, the search execution process is overlapped with the memory access process. Specifically, the Extractor 308 writes into one partition of Working Store 312 while the Predicate Evaluator 304 processes data out of the other partition. Finally, the Predicate Evaluator instructions contain a "next field" which allows an early exit out of the current predicate term or out of the entire predicate if the current results uniquely define the search outcome. For example, when the first term of a sequence of AND terms is false, the other terms need not be evaluated. The result is false regardless of what they are.

The Predicate Evaluator 304 performs comparisons of quadword operands and uses a stack 632 to hold temporary results. It accesses the Working Store 312 through the Working Store busses 316, 318. Record operands are fetched from the Working Store 312, constants are fetched from the constant table, and the results are written back to the Working Store 312.

The constant table (CT) 604 is an array of constant quadwords used to hold comparison constants and Working Store addresses. The constant table 604 is read into the comparator 630 a quadword at a time for comparison operations. For address constants, only the least significant 16 bits are used out of a quadword. The constant table 604 is written one doubleword at a time by the Control Processor 310. The constant table 604 is initialized by the Control Processor 310 using the control bus 320. A representative size for the constant table is 2K deep by 128 bits wide.

The Instruction table 602 is a doubleword array of instructions that is loaded by the Control Processor 310 with the search program to be executed. The instruction table 602 is addressed by an instruction counter (IC) 606 and instructions are read into the instruction register (IR) 608. A representative size for the instruction table is 2K deep by 64 bits wide.

The Instruction Register (IR) 608 is a doubleword register which holds the instruction during execution. It has the following subfields:

A,B,D Offsets from the Base A, B, and D registers, respectively, for the operand fetch address from Working Store or the destination address for the result (D). The A, B and D fields can also specify a constant table address.

C Instruction type field.

F Flags. This field contains flag bits which control the operation, the post-ANDing or post-ORing of the stack, the looping for longer than doubleword comparisons, and the next field branching.

Next This field (N0, N1) specifies an instruction address to be branched to if the result of this instruction is either true or false. The choice is specified in the F field. The next field allows the Predicate Evaluator to identify when a query is resolved early and to take a branch around the instructions that do not need to be executed. This saves execution time and improves performance. Due to the pipeline length and the two cycle delay caused by taking a next field branch, the next field branches only result in improved performance if the instructions are greater than two instructions apart, otherwise the next field should not be used.

The I-Adder 610 is a binary adder that updates the instruction counter 606 by incrementing by 1, adding the next field from the instruction register (provided via a mux 612), or resetting to zero. The instruction counter 606 can be reset to any address by the control processor 310 via the control bus 320. A representative size for the adder is 11 bits.

The predicate evaluator includes three Base Registers BASE-A 614, BASE-B 616, and BASE-D 618. The base registers are used to save the base address in the Working Store 312 of the A and B operands, and the result destination (D). Operand fetches are performed by adding offsets to these registers to create the Working Store address.

Also provided are two length registers, LEN-A 620 and LEN-B 622. The length registers are loaded by the instructions with the number of quadwords to be compared (i.e., the length of the operand) and decremented in a looping fashion until they become zero, indicating that the comparison is complete. A record count register 624 contains the number of records to be processed.

Two 16-bit adders (designated together by reference numeral 626) are used to update the length, base, and/or record count registers during instruction execution. These adders 626 also produce zero condition flags that can be tested to identify zero length or record count conditions. The output of the adders are provided to an output register 628. The output register 628 is a staging register for data to be written to the Working Store 312 (FIG. 3) from the Predicate Evaluator 304. The Predicate Evaluator 304 will write pointers to selected records back to the Working Store 312 so that they can be used by other processing elements.

The comparator 630 is a three input comparator that compares two quadwords and then compares the boolean result to the top-of-stack (TOS) from the stack 632. The top-of-stack is effectively popped and then the result is pushed on the stack. Operands for the comparator 630 are provided by the A and B Registers 634, 636. The A register (A-REG) 634 and the B register (B-REG) 636 are loaded from the Working Store 312 for every instruction, except instructions that compare the A register 634 to an address contained in the constant table 604 do not load the B register 636.

The comparator 630 can perform the following comparisons of the A and B register (or constant table) values: greater than, less than, less than or equal, greater than or equal, equal, and not equal. In addition it can perform the following Boolean operations: AND, OR, and NOT on either the result of the A/B register (or constant table) comparison and the TOS or the two top elements of the stack. In the first case the TOS is popped then the result pushed on the stack, in the latter case both top elements are popped and the result is pushed on the stack. The resulting value is also sent to the control and sequencing logic 634 to determine if a next branch is to be taken.

The stack 632 is a 1-bit wide, last in/first out stack that is used to hold temporary values during processing of the query. The two top elements are available to the comparator 630 for processing at any time.

The control and sequencing logic 638 is a conventional microsequencer which controls the sequencing and branching of operations within the Predicate Evaluator 304. The Predicate Evaluator 304 preferably uses a 3 cycle pipeline that runs at either one or two cycles per instruction initiation.

The Predicate Evaluator 304 instruction set comprises nine instruction types:

1. Compare then AND with the top-of-stack (TOS). The two operands, either the A and B registers 634, 636 or the A register 634 and a constant from the constant table 604 are compared and the result is ANDed with the TOS value. The boolean result of this operation is pushed on to the stack 632 in place of the previous TOS value. Valid comparison operators are greater-than, less-than, less-than or equal, greater than or equal, equal, and not equal.

2. Compare then OR with the top-of-stack (TOS). The two operands, either the A and B registers 634, 636 or the A register 634 and a constant from the constant table 604 are compared and the result is ORed with the TOS value. The boolean result of this operation is pushed onto the stack 632 in place of the previous TOS value. Valid comparison operations are greater-than, less-than, less-than or equal, greater than or equal, equal, and not equal.

3. Compare and push on stack. The A and B registers 634, 636 or the A register 634 and a constant from the constant table 604 are compared and the boolean result is pushed on the stack 632. Valid comparison operators are greater-than, less-than, less-than or equal, greater than or equal, equal, and not equal.

4. Add or subtract. Two operands are either added or subtracted by the adder 626 and the result is stored in the identified destination register. Valid source operands are the Base A/B, Length A/B, the Record Count, Base D, and the Constant (from the constant table 604). The result can go to any of the above and also to the output register 628. Add and subtract set a condition flag in the control and sequencing logic 638, indicating when the result is zero.

5. Working Store access instructions: readws and writews. Readws puts the data into either the A or B register 634, 636. Writews writes the value in the output register 628 to the Working Store address specified. The address is generated from any of the base registers.

6. Stack operations: push and pop. These instructions push a value on the stack or pop a value off of the stack 632.

7. Stack logical operations: AND, OR, and NOT. The top two elements of the stack 632 can be ANDed or ORed by the comparator 630 and the result pushed onto the stack in their place. The NOT TOS instruction inverts the TOS.

8. Restart. The Restart instruction branches back to the beginning address of the program and resets the stack pointer to zero (empty stack) and increments the base A and B registers. This instruction is used after a record has been searched and starts the evaluation of the next record. The record count and the Base-D registers 624, 618 are updated prior to the execution of this instruction.

9. Stop and send status. This instruction halts the execution of the Predicate Evaluator 304 and sends a status word to the Control Processor 310. The status word contains flags and information from the instruction. It is used to tell the control processor that the Predicate Evaluator is done processing a block of records, that the output area is full, or that an error has occurred.

Predicate Evaluator instructions perform three types of functions, updating pointers in the Predicate Evaluator 304, comparing operands, and writing results to the Working Store 312. Pointers are maintained in the BASE A and BASE B registers 614, 616 for each of the records that are to be compared, and are updated each time a record is processed. Records are stored in the Working Store 312 in sequential order, and the pointer provides a base address for a record, with the offset field in the instruction pointing to the column in the record that is to be compared. Results are written back in Working Store 312 at the address given by the destination (BASE D) register 618. The BASE D register 618 is also updated each time a result is generated. The BASE A, BASE B and BASE D registers are incremented by the length A/B registers 620, 622, or constants within the constant table 604.

Instructions are fetched out of the instruction table 602 into the instruction register (IR) 606. The instruction fetch and decode takes one cycle, after which there is a one or two cycle operand fetch, and finally the execution takes one cycle. Thus the execution pipeline is three cycles long, with instructions initiated every one or two cycles. Instructions that have two Working Store operands take two cycles for the operand fetch phase and thus require two cycles between initiations. Instructions that have a Working Store operand and a constant table operand take only one cycle for the operand read since both can be read in parallel, thus these instructions can be initiated every cycle.

The program stored in the instruction table 602 is created by the control processor 310 from the query predicate given with the command. It is a translation of the predicate that takes into account where in the Working Store 312 the records are stored and their format. In general, the query processing follows the following scheme:

1. The Control Processor 310 reads the command, data descriptors, and predicate to be executed and decides how the records are to be stored in Working Store 312 for evaluation. The records are extracted so that the columns of interest are placed together within the record to facilitate comparisons. The Control Processor 310 initiates the storage accesses and extraction operations to load the first block of records into the Working Store 312.

2. While the first block is being loaded the Control Processor 310 translates the predicate into the Predicate Evaluator program, using the format of the records in the Working Store 312 and the required fields as a guide. It then evaluates the program and sets the next fields so that the Predicate Evaluator 304 can take the "early exit" from the predicate when possible.

3. Once the program has been created it is loaded into the Predicate Evaluator instruction table 602. Any constants that are needed are loaded into the constant table 604. Finally, all of the base, length, and count registers 614–624 are loaded with values that point to the correct locations in the Working Store 312. This is all done through the control bus 320 while the Working Store 312 is being loaded with the first block of records.

4. Once the first block is loaded, the Control Processor 310 tells the Predicate Evaluator 304 to start processing it. Meanwhile, the Extractor/Memory Interface Unit 308 is setup to load the next block of records in the opposite partition of Working Store 312. This loading operation is started to run in parallel with the processing of the first block by the Predicate Evaluator 304. Processing continues in this fashion until the search is completed, the output area in Working Store becomes full and must be written back to memory, or an error occurs.

5. When the search is completed the Extractor/Memory Interface Unit 308 is instructed to write any remaining result records to the system memory and the operation terminates.

g. Sort/Merge Unit

The Sort/Merge unit (DBSM) 302 performs the operations of sorting, merging, and joining. Additionally, the Sort/Merge unit performs the set operations of union, intersection, difference, and cross-product on lists of keys. The similarity of these operations allows them to be performed in the same hardware element efficiently. All of the operations access the Working Store 312 (FIG. 3) exclusively, processing blocks of data that are loaded from the system's main or page storage 410, 412 (FIG. 4). This reduces the load on the system storage and provides one cycle access to keys.

Figure 7:
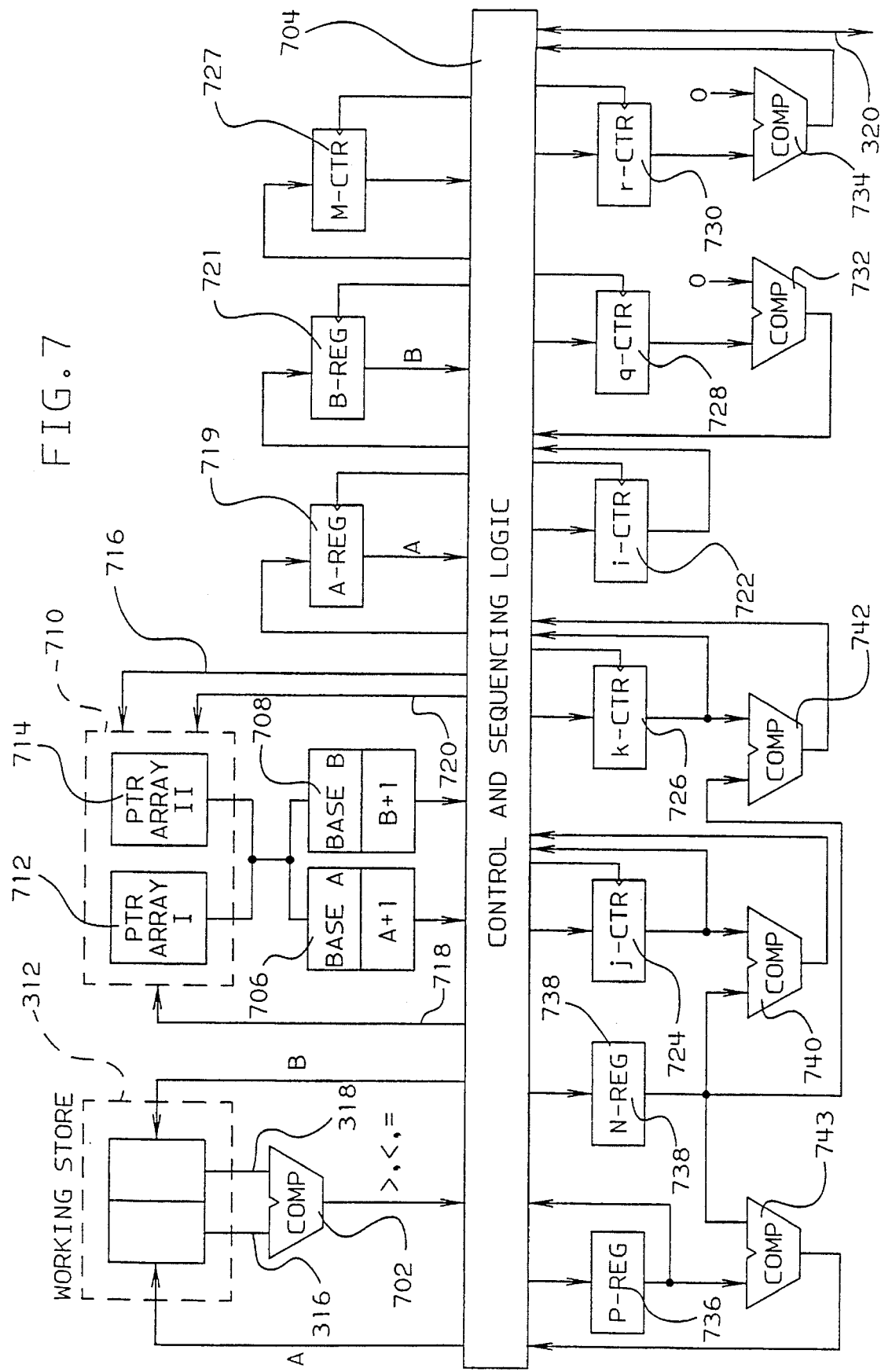
FIG. 7 is a diagram illustrating an embodiment of the Sort/Merge Unit of FIG. 3. The interaction between the Sort/Merge Unit and the Working Store of FIG. 3 is also illustrated.

The Sort/Merge Unit hardware will be better understood by reference to FIG. 7. Sort and merge operations are performed using a comparator 702 (the key comparator) that compares two quadword (16 byte) operands from the Working Store 312 each read cycle. Each of the two operands enters the comparator 702 by way of one of the two Working Store busses 316, 318. Preferably, each operand comes from a different one of the two independently addressable Working Store partitions. This configuration further accelerates the sort operations by enabling concurrent access to both operands.

The key comparator 702 produces a 2 bit result that identifies the result of the comparison as being an "equal to", "less than", or "greater than" condition. The 2 bit result is sent to the control and sequencing logic 704, the operation of which will be described later.

The Working Store addresses for the two operands to be compared are held, respectively, in the BASE A and BASE B registers 706, 708. The addresses A,B of the two operands are obtained from an internal memory 710 which comprises two independently addressable memory arrays (pointer arrays) 712, 714. The pointer arrays 712, 714 are loaded by way of a data bus 716, with the Working Store addresses of the operands. The pointer arrays 712, 714 are independently addressable by addresses provided from the control and sequencing logic 704, respectively by way of a first address bus 718 and a second address bus 720. The Working Store addresses are obtained from the extractor portion of the extractor/memory interface unit 308 (FIG. 3).

In order to provide for more efficient fetching of operands, the address of the subsequent key is read from the pointer arrays 712, 714 in the same read cycle as the base key address. The subsequent key addresses are stored within the BASE A and BASE B registers 706, 708 along with the current (base) key addresses. In order to enable comparisons of multiple quadword keys, the BASE A and and BASE B addresses are loaded into the A and B address counters 719, 721 respectively. The A and B address counters 719, 721 can be incremented by the control logic 704, one quadword address at a time in order to address the keys in quadword size portions. Thus, multiple quadword keys can be compared by the comparator 702, one quadword at a time. In the embodiment of FIG. 7, the A and B addresses are provided to the Working Store 312 by way of the outputs of the A and B address counters 719, 721, respectively. Where multiple quadword keys are not contemplated, the BASE A and BASE B registers can be used to address the Working Store directly 312.

In order to keep track of the addresses of pertinent data, the sort and merge unit uses a number of pointers. During each pass of the sort operation one of the pointer arrays is assigned as a source (READ) array, while the second is assigned as a destination (WRITE) array. The i and j pointers, generated respectively by the i counter 722 and the j counter 724, provide addressing for the source array. The k pointer, generated by the k counter 726, provides addressing for the destination array. The m counter 727, is used to keep track of base node addresses for tournament tree merge sorting (explained in more detail infra). The i, j and k and m counters 722–727 are loaded with an initial value by the control processor 310 (FIG. 3) by way of the control and sequencing logic 704. Each of the counters 720–726 can be incremented by the control and sequencing logic 704.

The sort/merge unit operates by processing the keys as groups of lists and performing binary merge/sorts on two lists at a time. The q and r pointers, generated respectively by the q counter 728 and the r counter 730, keep track of the remaining number of elements in each of the two lists. The q and r counters 728, 730 are loaded with an initial value by the control and sequencing logic 504 and can be decremented under by the control and sequencing logic 704. First and second comparators (the q/0 and r/0 comparators) 732, 734 are connected to receive, respectively, the outputs of the q and r counters. The comparators 732, 734 detect when each of the q and r counters have been decremented to zero. Each of the comparators 732, 734 is of the type which produces a one bit binary output which identifies the result of the comparison as being an "equal to" or a "not equal to" condition. The results of the comparisons are sent to the control and sequencing logic 704.

The initial length of the two lists to be merged p is provided by the control processor 310, via the control bus 320, and held in the p register 736. The initial number of keys to be sorted n is also provided by the control processor 310 and held in the n register 738. A third comparator (the j/n comparator) 740 compares the value of the j pointer (from the j counter 724) with the value of n (from the n register 738) and informs the control and sequencing logic 704 when j>n. Similarly, a fourth comparator (the k/n comparator) 742 compares the value of the k pointer (from the k counter 726) with the value of n (from the n register 738) and informs the control and sequencing logic when k>n. The third and fourth comparators 740, 742 are of the two bit output type that report the comparison results as being any of "equal to", "greater than" or "less than". A fifth comparator 743 compares the value in the p-register 736 with the value in the n register 738 and produces a one bit result which indicates whether or not p>=n.

The control and sequencing logic 704 sequences all of the adders, comparators, and pointer arrays in the Sort/Merge Unit 302. Control algorithms (described in more detail below) are similar for each of the operations performed, but require different sequences. It is a function of the control and sequencing logic 704 to coordinate all of the elements.

The control and sequencing logic 704 is preferably embodied as a programmable logic array designed to implement the sort/merge unit algorithms (described below). Alternatively, the control and sequencing logic 704 can be embodied as conventional microprocessor which performs the sort/merge unit algorithms using the above-described hardware, under control of a microcode program.

The operation of the control and sequencing logic 704 and the sort/merge unit in general will be better understood by way of an example. FIG. 8 illustrates an example of an ascending block sort (binary merge/sort) on eight keys (E,H,D,C,A,F,B,G).

During the first pass of the block sort, the keys are processed as eight lists 802–816, each having a length of 1 key. A comparison is performed on each pair of keys, (E,H D,C A,F B,G). As a result of the comparisons, the 8 original keys are placed into four new lists of two keys each 818–824. Each of the four lists comprises the comparison "winner" preceding the comparison "loser", i.e. E,H C,D A,F B,G.

After the first pass of the binary merge/sort is complete, a second pass is performed. During the second pass, the four lists of two keys each 818–824 are compared. In other words, list E,H is compared with list C,D and list A,F is compared with list B,G. As each "winner" is determined, it is written into a new, merged list. As a result of the second pass of comparisons the keys are again reordered into two lists 826, 828 of four keys each, i.e. C,D,E,H and A,B,F,G.

After the second pass is complete, a third merge/sort pass is performed on the two lists 826, 828. Comparisons are performed on the two lists (i.e. C is compared to A, and A is the "winner", then C is compared to B and B is the "winner", etc.). As each winner is determined it is written into a final list 830. The final list 830, is a single list having a length of eight keys in ascending order, i.e. A,B,C,D,E,F, G. The number of passes required to complete a binary merge/sort is equal to LOG2 of the number of keys to be sorted with resulting fractions rounded to the next highest number.

In order to perform the above-described ascending sort operation the sort/merge unit operates in cooperation with the other functional elements of the Database Engine. Initially, the control processor 310 (FIG. 3) designates one of the pointer arrays (e.g. 712, FIG. 7) as the source (READ) array. The other array (e.g. 714, FIG. 7) is initially designated as the destination (WRITE) array. The Working Store 312, and the READ array are respectively loaded with a number (n) of input keys and their corresponding Working Store addresses. The keys to be sorted are supplied to the Working Store 312 by the Extractor/Memory Interface Unit 308 (FIG. 3). The Extractor/Memory Interface Unit 308 reads records from the page storage 412 (FIG. 4), extracts the keys, and writes them into the Working Store by way of the Working Store busses 316, 318 (FIG. 3).

The initial state of the Working Store 312 for the ascending sort example of FIG. 8 is illustrated in FIG. 9. Each key A–G is stored along with a record identification number (RID) which identifies the database record from which the key originated. As the keys are written to the Working Store 312, the corresponding Working Store addresses are written into the designated READ array. In FIG. 9, the first pointer array 712 is initially designated as the READ array for the first pass of the block sort. Reference numeral 712(1) designates the first pointer array 712 in its initialized state for the first pass.

When the Working Store 312 and the source pointer array have been initialized, the Control Processor 310 issues a START ASCENDING SORT (SAS) command to the Sort/ Merge Unit 302 by way of the control bus 320. In response to the SAS command, the control and sequencing logic 704 executes the algorithm illustrated in FIGS. 10A and 10B. As used in FIGS. 10A and 10B, WS(A) and WS(B) refer, respectively, to the keys stored in addresses A and B in the Working Store 312. Similarly, READ(i) and READ(j) refer, respectively, to the Working Store addresses stored in addresses i and j of the designated READ pointer array. WRITE(k) refers an address k in the designated WRITE array.

Figure 10A:
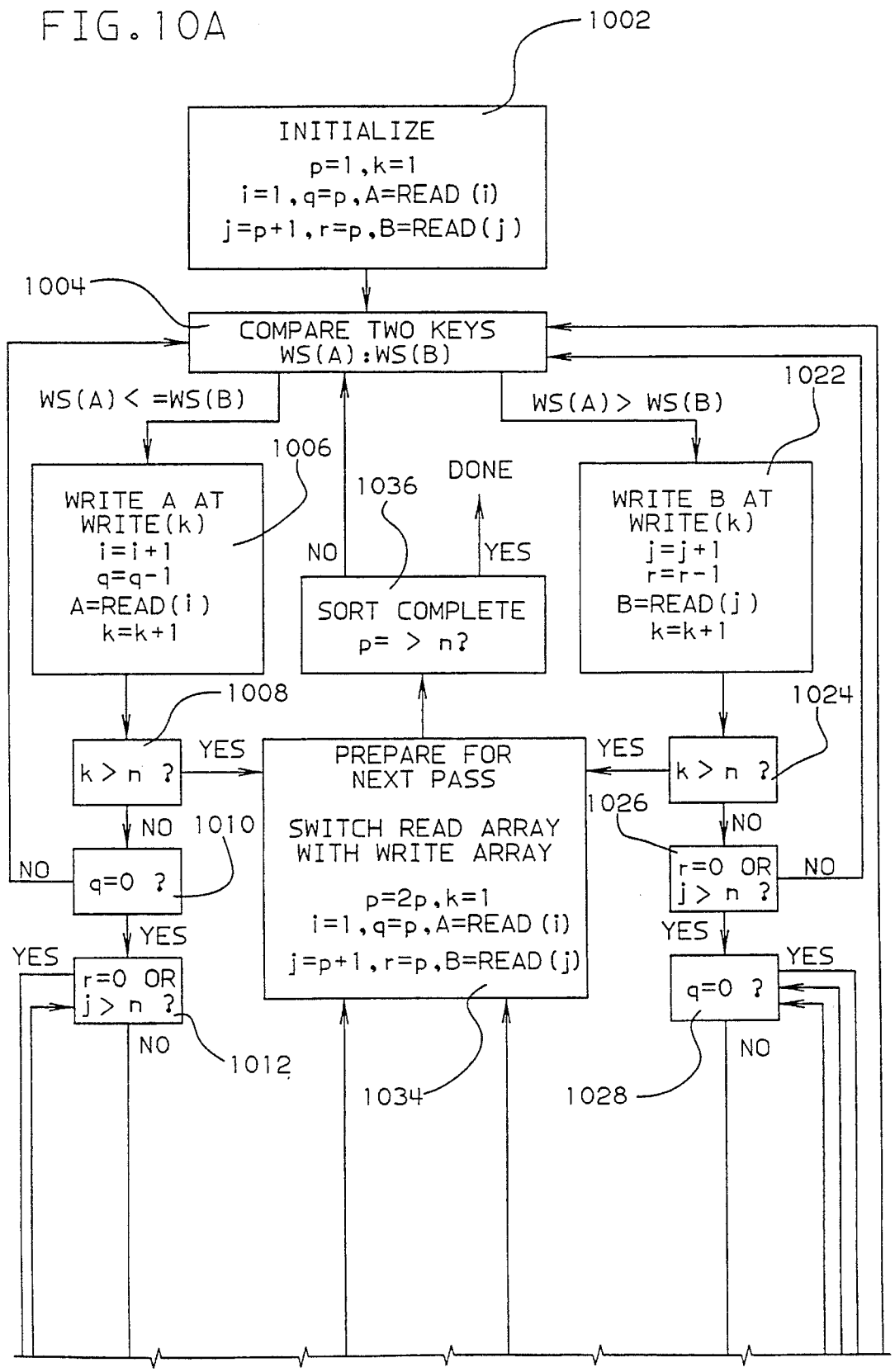
FIGS. 10A and 10B are, respectively, top and bottom halves of a flow chart of the binary sort/merge algorithm used by the Sort/Merge Unit (DBSM) of FIG. 3.
Figure 10B:
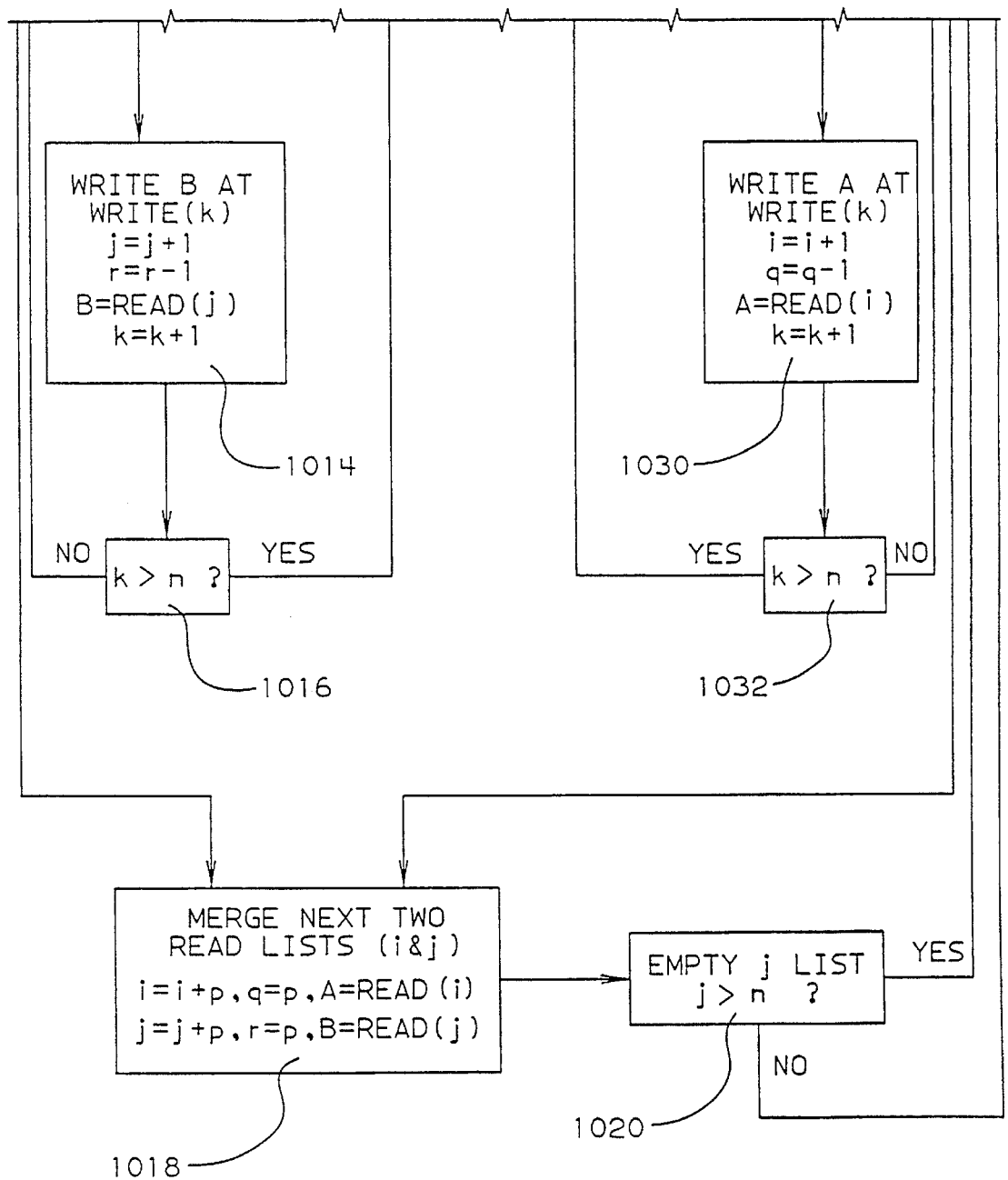

The algorithm of FIGS. 10A and 10B will now be explained by reference to the ascending sort example of FIG. 9 and the sort/merge unit of FIG. 7. In step 1002, the pointers are set as follows: the p register 736 is set to the initial list length of 1; the i-counter 722 is set to 1, so that it points to the Working Store address 00 of the first key E of the first list; the j counter 724 is set to 2 (i.e. p+1), so that it points to the Working Store address 08 of the first key H of the second list; the q and r counters 728, 730 are set to the initial list length (i.e. 1); and the k counter 726 is set to point to the first address in the WRITE array (initially 714(1)). When this has been accomplished the BASE A register 706 is loaded with READ(1) (which is 00), and the BASE B register 708 is set to READ(2) (which is 08).

In step 1004, the E key (WS(00)) is compared to the H key (WS(08)) at the key comparator 702. The key comparator 702 in turn signals the control and sequencing logic 704 that E is less than H. In response to the "less than signal", the control and sequencing logic 704 performs the operations of step 1006. Specifically, the address (00) of the E key is written into the designated WRITE array 714(1) at address 1 (as specified by the k counter 726); the i counter 722 is incremented to 2, the k counter 726 is incremented to 2, the q counter 728 is decremented to 0 and the BASE A register 706 is set to READ(2), which is 08. Step 1008 is then performed.

In step 1008, the k/n comparator 742 compares the WRITE pointer k from the k counter 726 to the total number of keys to be sorted n (as stored in the n register 738). Since in this case, the write pointer k is equal to 2 and the number of keys to be sorted n is equal to 8, the k/n comparator reports a less than or equal to condition to the control and sequencing logic 704. Responsive to this condition, the control and sequencing logic 704 executes step 1010.

In step 1010, the control and sequencing logic 704 uses the output of the q/0 comparator 732 to determine if there are any elements remaining in the first list. Since the original list length p was 1, and since one element from the first list (i.e. key E) has already been compared, the remaining elements in the first list is equal to zero. In response to the "equal to" condition from the q/0 comparator 732, the control and sequencing logic 704 executes step 1012.

In step 1012, the control and sequencing logic 704 reads the outputs of the j/n comparator 740 and the r/0 comparator 734 to determine if either the remaining key count in the second list is equal to 0 (r=0) or the second list pointer (as determined by the j counter 724) is set at a count greater than the total number of keys to be sorted. Since the second list still includes the H key the value of the r counter 730 will be equal to 1 and the r/0 comparator 734 will indicate to the control and sequencing logic 704 that r is not equal to 0. Similarly, since the second list pointer is still set to 2 (pointing to Working Store address 08) and the list length n is equal to 8, the j/n comparator 740 will indicate the less than or equal to condition. Responsive to the presence of both the j<=n condition and the r not equal to 0 condition (the non presence of j>n OR r=0), the control and sequencing logic 704 will execute step 1014.

In step 1014, the Working Store address of the H key (B=08) is written into the designated WRITE array at the k pointer address designated by the k counter 726. After this has been accomplished, the j counter 724 is incremented to 3; the r-counter 730 is decremented to 0, the k counter 726 (WRITE array address) is incremented to 3; and a Working address B=10 for a key in the second list is read from the READ pointer array at READ(2). The control and sequencing logic 704 then executes step 1016.

In step 1016, the control and sequencing logic 704 uses the output of the k/n comparator 742 to determine whether the WRITE array address has exceeded the number of keys to be sorted. Since the number of keys to be sorted n is 8 and the WRITE array address is 3, the k/n comparator 742 indicates a less than or equal to condition. Responsive to the less than or equal to condition, the control and sequencing logic 704 again executes step 1012.

As with the previous execution of step 1012, the control and sequencing logic 704 reads the outputs of the j/n comparator 740 and the r/0 comparator 734 to determine if either the remaining key count in the second list is equal to 0 (r=0) or the second list pointer (as determined by the j counter 724) is set at a count greater than the total number of keys to be sorted. Since the H key from the second list has now been written to the WRITE array, the value of the r counter will be equal to 0 and the r/0 comparator 734 will indicate to the control and sequencing logic 704 that r is equal to 0. Responsive to the presence of the r=0 condition, the control and sequencing logic 704 executes step 1018.

In step 1018, the control and sequencing logic 704 sets up the pointers for the merge/sort of the next two lists. In this example, the first two lists comprised the E and H keys. The next two lists therefore comprise the D and C keys. In preparation for processing the next two lists, the i counter 722 is reinitialized with its present value plus the list length (i=i+p). The i pointer will therefore be equal to 3 and will point to Working Store address 10 in the READ array 712(1). The j counter 724 will be similarly reinitialized with the value of j+p. The j counter 724 will therefore be equal to 4 and will point to Working Store address 18 in the designated READ array 712(1). The q and r counters 728, 730 will both be initialized to the list length of 1. The BASE A register 706 is then loaded with the address 10 of the D key (READ (3)), while the BASE B register 708 is loaded with the address 18 of the C key (READ(4)). The control and sequencing logic 704 then executes step 1020.

In step 1020, the control and sequencing logic 704 reads the output of the j/n comparator 740 to determine if the j list is empty. Since the total number of keys to be sorted is equal to 8 and since the j pointer is only equal to 4, the j/n comparator 740 will produce a less than or equal to result. Responsive to this result, the control and sequencing logic 704 will again execute step 1004 for the new lists.

In the second iteration of step 1004, the D key (WS(10)) is compared to the C key (WS(18)) at the key comparator 702. The key comparator 702 in turn signals the control and sequencing logic 704 that D is greater than C. In response to the "greater than" signal, the control and sequencing logic 704 performs the operations of step 1022.

It should be understood that steps 1022 through 1032 are executed in a similar manner to steps 1006 through 1016. The actual manipulation of the counters and use of the comparators will be self evident from FIG. 10. For example, in step 1022, the C key is written into the designated WRITE array 714 at address 3 (as specified by the k counter 726); the j counter 724 is then incremented to 5, the k counter 726 is incremented to 4, the r counter 730 is decremented to 0 and the BASE B register 708 is set to READ(5), which contains Working Store address 20. Later, as a result of the execution of 1030, the D key is written into the WRITE pointer array 514(1) at address 4.

Steps 1004 through 1030 are repeated iteratively until all four pairs of lists E,H D,C A,F B,G have been merged and appear as shown in the WRITE pointer array 714(1) designated for the first pass.

The completion of the first pass is determined by one of steps 1016 or 1032, depending on whether the merge of the last two keys results in the WS(a)<=WS(B) path to be taken or the WS(A)>WS(B) path. Since the comparison of the last two keys B,G will result in the WS(A)<=WS(B) path to be taken, the end of the first pass will be detected by step 1016.

After step 1014 is executed for the last element, the k counter 726 will be set to 9. Since k=9 and the number of elements n=8, the k/n comparator 742 will indicate that k is greater than n. Responsive to this indication, the control and sequencing logic will execute step 1034.

In step 1034, the counters and registers are reinitialized for the second pass of the binary merge sort. As will be observed from FIG. 9, the read and write arrays are swapped so that the second pointer array 714(1) will now supply the Working Store address while the first pointer array 712(2) will serve as a repository for the merged addresses.

In addition to the swapping of the designated READ and WRITE pointer arrays, the counters and registers are initialized as follows: the list length p is doubled so that 4 lists of two keys each are formed (i.e. EH, CD, EF, BG); the j, q, and r counters are reinitialized based on the updated list length so that j=3, q=2 and r=2; and the first list pointer (the i counter) is reset to 1. Finally, the BASE A register 706 is loaded with the Working Store address (00) of the first key E in the first list, while the BASE B register is loaded with the Working Store address 18 of the first key C in the second list. Step 1036 is then executed.

Step 1036 is executed to determine whether the sort is complete. The control and sequencing logic 704 compares the number of keys to be sorted (the value in the n register 738) with the number of keys in each list (as held in the p register 736). In this case, since the list length p=2 and the number of keys to be sorted is equal to 8, the sort is not complete. Upon determining that the sort is not complete, the control and sequencing logic 704 again iteratively executes the appropriate ones of steps 1004 through 1032 until the last two keys F and G in the last two lists have been compared and merged. As a result of the second iteration of merges, the Working Store addresses are written into the WRITE pointer array as shown in reference numeral 712(2).

When the second pass is complete (as determined by step 1032 since F>G) step 1034 is again executed. For the third and final pass 806, the READ and WRITE arrays are again swapped so that 712(2) becomes the READ array and 714(2) becomes the WRITE array; the list length p is again doubled to 4 so that two lists of 4 are operated on, specifically, CDEH and ABFG; and the counters and registers are set appropriately as indicated in block 1034.

At the end of the third pass, the WRITE array 714(2) appears as shown in FIG. 9. After the third pass, step 1032 is executed one more time and the list length p is set to 8.

The end of the sort operation is determined by step 1036. When the list length p is greater than or equal to the total number of keys to be sorted n, the sort is complete. The sort/merge unit informs the control processor 310 of the sort completion by asserting a signal on the control bus 320. When the control processor 310 receives the sort complete signal, it commands assembler function of the Extractor/Memory Interface Unit 308 (FIG. 3) to move the records from the Working Store 312 back into the system memory. Records are placed into the system memory in sorted format by the memory interface unit addressing the keys from Working Store in the order designated in the final WRITE pointer array (e.g. FIG. 9, 714(2)).

As has been described, The sort function of the Sort/Merge Unit 702 is preferably a hardware implementation of a binary merge sort. Binary merge sort techniques are discussed in detail in the book *Sorting and Sort Systems* by Harold Lorin, published by Addison-Wesley Publishing Company, Inc., Library of Congress Catalog Card No. 73-2140, copyright 1975, which is incorporated by reference as if printed in its full text below. The binary merge sort is performed on Working Store size blocks of keys at the rate of one quadword comparison per cycle. The number of keys contained in each block is dependent on the keylength.

Longer lists of keys are created by merging the sorted blocks. Merging, is the act of combining of two or more ordered lists into a single ordered list. The merge implemented is a hardware implementation of a 128-way "tournament tree." using a replacement/selection algorithm. The 128-way merge outputs a result every seventh cycle, performing a quadword compare every cycle in a 7 level tree. The structure and operation of hardware tournament tree merge will be better understood by reference to FIGS. 7 and 12–14.

Figure 12:
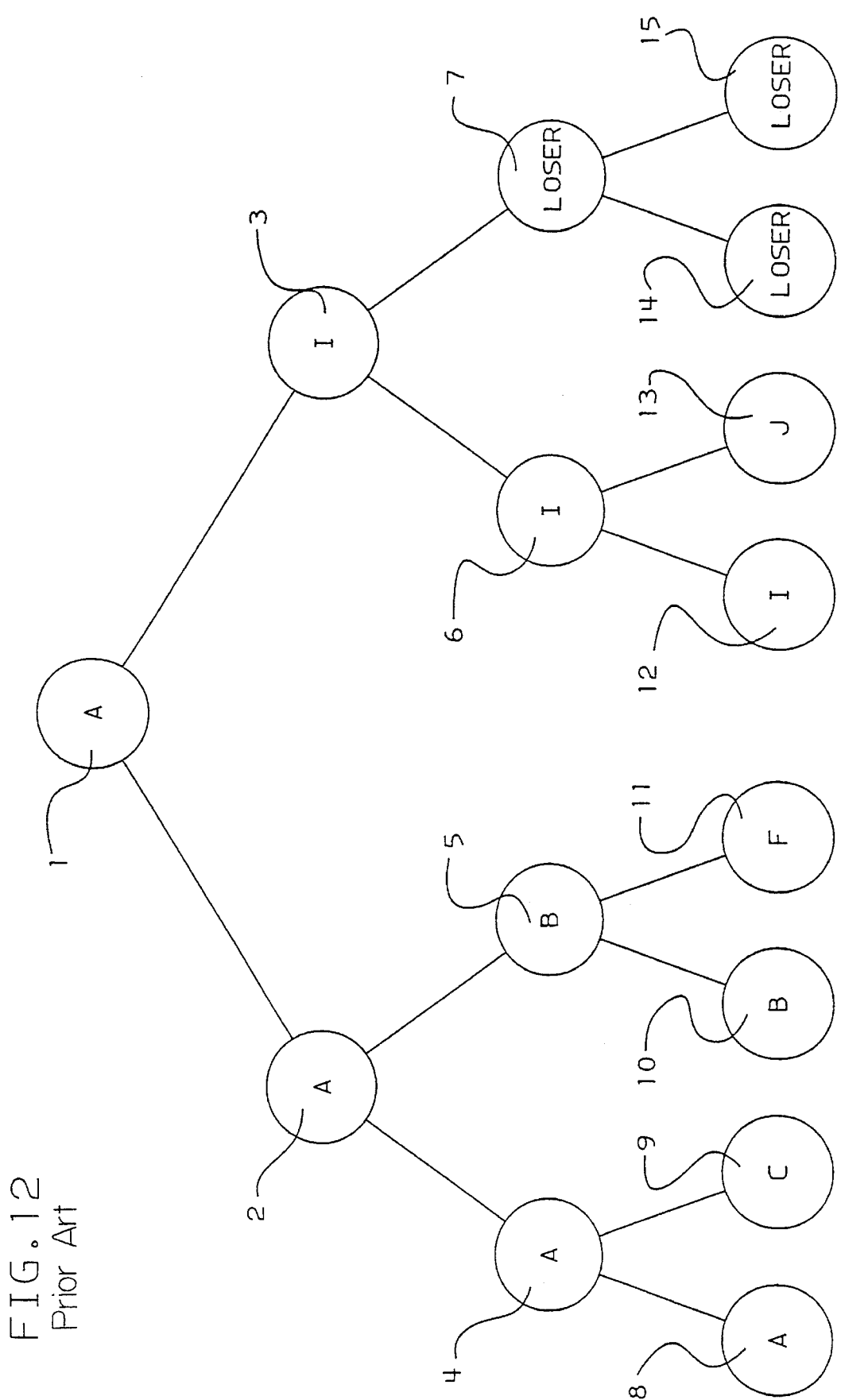
FIG. 12 is an illustration of a conventional tournament tree.

FIG. 12 is an illustration of a conventional 8-way tournament tree. An eight way tournament tree has 15 nodes 1–15 and performs three levels of comparisons. Keys from eight lists to be merged enter the tree at its base (nodes 8–15). Winning keys advance upwards through the tree. The winner of the third level of comparison is taken from the tree at node 1 and placed in the final merged list.

FIG. 13A is an illustration of the initialization of the Working Store 312 and the pointers arrays 712, 714 by the Control Processor 310 for the hardware tournament tree operation. Based upon the number of lists to be merged, the Control Processor calculates the width (number of base nodes) and the height (number of levels of comparison) of the tournament tree. The width (m) of the tree is equal to the number of lists to be merged rounded to the next highest power of 2. The number of levels of comparison (L) in the tree is equal to $\log_2$ of of the width (m).

In the example of FIG. 13A, there are six lists 1302–1312 in Working Store 312. The lists 1302–1312 are brought into the Working Store 312 by the Extractor/Memory Interface Unit 308 responsive to an initiation command from the Control Processor 310. Since there are six lists, the Control Processor 310 calculates the width (m) the tree as 8 and the number of levels of comparison (L) as 3 ($\log_2$ of 8). The Control Processor 310, therefore, logically partitions the pointer arrays 712, 714 into 4 areas 1314–1320, one for each of the three levels of comparison and one for the base.

Initially, the Control Processor 310 loads the level of comparison areas 1314–1318 of the pointer arrays 712, 714 with pointers to an automatic winner 1322 (i.e. a key that can not loose to other keys during a compare). The base area 1320 is initially loaded with pointers to the first key from each input list 1302–1312 held in the Working Store 312. Empty lists are represented by a pointer to an automatic loser 1324 in the corresponding position of the base area 1320. When the initialization of the Working Store 312 and the pointer arrays 712, 714 has been accomplished, the control and sequencing logic 704 of the Sort/Merge Unit 302 begins the process of filling the tournament tree.

Figure 14A:
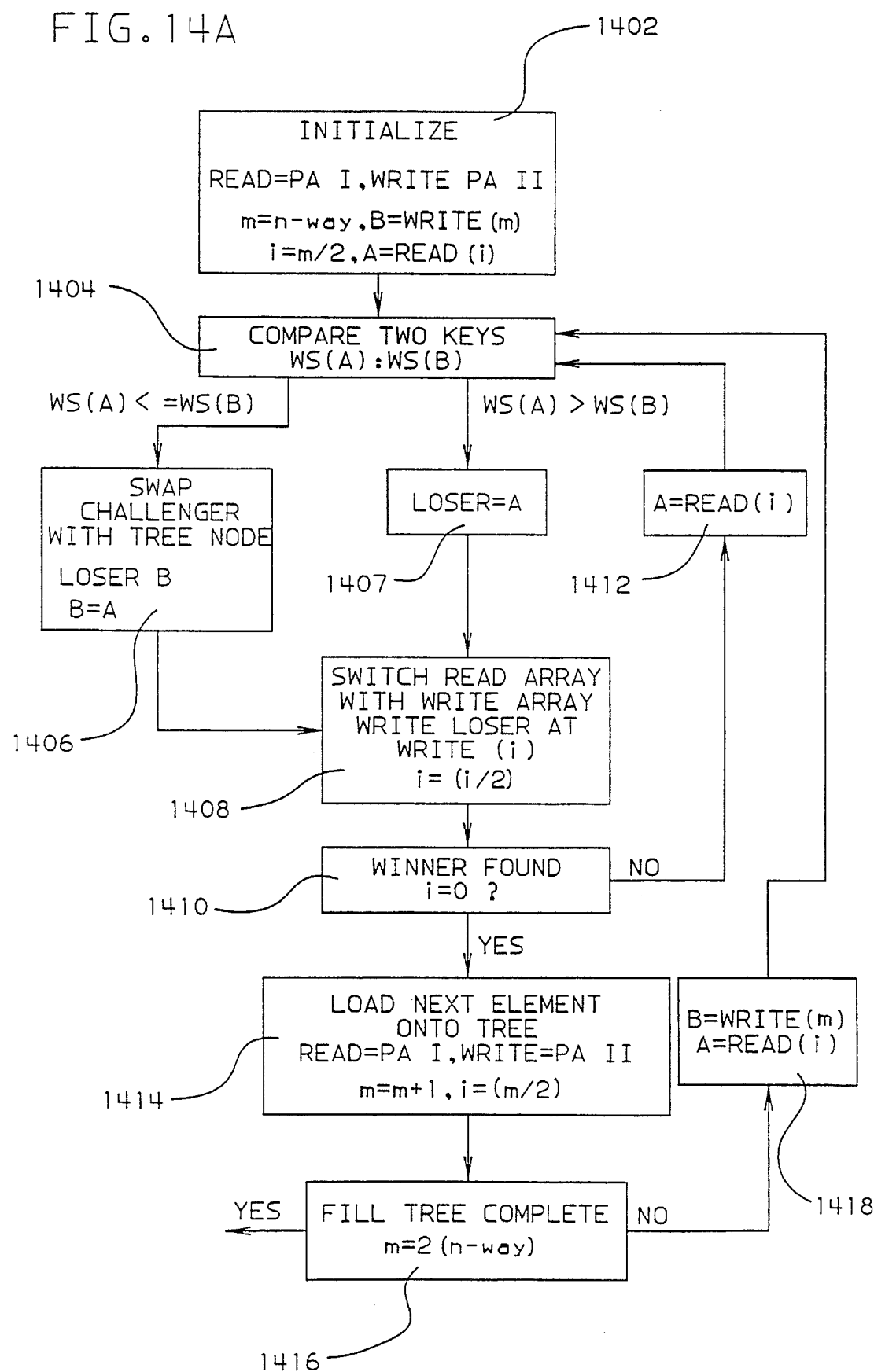
FIGS. 14A, 14B are flow charts of a sort algorithm using codeword techniques implemented using the additional hardware of FIG. 11.

The fill tree process for an ascending merge using the eight way tree of FIG. 12 is illustrated in FIG. 14A. The process of FIG. 14A comprises a replacement selection merge algorithm. Each of the variables described in FIG. 14A is held in the hardware of the Sort/Merge Unit of FIG. 7. Specifically, the variables A and B correspond the Working Store addresses held, respectively, in the A and B address registers 719, 721; the variable i (used in the process of FIG. 14A to determine the parent node) is held in the i counter 722; the variable m (used in the process of FIG. 14 to point to the base node) is held in the m counter 727; the variable Looser is a temporary storage location (for which the p register 736 can be utilized). As used in FIG. 14A, WS(n) refers to the contents of location n of the Working Store 312, WRITE (n) refers to the contents of location n of the designated WRITE pointer array, and READ(n) refers to the contents of location n the designated read pointer array.

In step 1402, the process variables are initialized and the READ and WRITE arrays are given their initial designations. As will be observed from FIG. 14A, pointer array 714 holding the base (nodes 8–15) is designated as the READ array and the pointer array 712 holding the level above the base (nodes 4–7) is designated as the WRITE array. Further, the width of the array, in this case 8, is set into the m counter 727 and the starting parent node number INT(m/2)=4 is loaded into the i counter 722. This being accomplished, the A register 719 is loaded with the Working Store address at READ(4) and the B register 721 is loaded with the Working Store address at WRITE(8).

It will be observed that initially, READ(4) contains the Working Store address (16) of an automatic winner while WRITE(8) contains the Working Store address (1) of the key "A". It should be understood that the nodes of the tournament tree as configured in the pointer arrays 712, 714 hold pointers to keys rather than the keys themselves.

In step 1404 the key at WS(A) is compared with the key at WS(B) by the comparator 702. Thus the key "A" (at WS(1)) is compared with an automatic winner (at WS(16)). Responsive to a determination by the comparator 302, that WS(A)<=WS(B), the control and sequencing logic 704 executes step 1406.

In step 1406, the node address (8) of the challenger is is stored in a temporary storage area called LOOSER (e.g. in the p register 736) and the B register 721 is loaded with the address (4) of the parent node. It will be seen from FIG. 14A, that, alternatively, if WS(A)>WS(B) step 1407 is executed, LOOSER is loaded with A and the contents of the B register are left intact. In any event, step 1408 is then executed.

In step 1408, the designations of the READ and WRITE pointer arrays are swapped and the comparison loser is written on to the tree. In other words, pointer array 714 becomes the READ array and pointer array 714 becomes the WRITE array. In the present example, the Working Store address (8) of the loser "A" is written on to the tree by loading it into the WRITE array 714 at the address i (=4). The i counter is then reloaded with INT(i/2) and step 1410 is executed.

In step 1410, the i value is compared with 0 to determine if the first winning key has been found. If i is not equal to 0, then step 1412 is executed.

In step 1412 the pointer content of the parent node at the next highest level is loaded into the A register 719. Since i=2, the A register is loaded with READ(2) which is the Working Store address (16) of the an automatic winner. Step 1404 is then again executed and the keys at WS(A) and WS(B) are compared by the comparator 302. Since WS(16)=automatic winner, then WS(A)<=WS(B) and steps 1406–1410 will again be executed.

From the foregoing, it will be apparent that steps 1404 through 1412 are executed iteratively until interrupted by a determination, in step 1410, that i=0. FIG. 13B illustrates the state of the pointer arrays 712, 714 at the first detection of i=0 by step 1410.

When it is detected that i=0 step 1414 is executed to begin the loading of the next key onto the tree. In step 1414, the base node address (m) is incremented by one, the parent node address (i) is set to INT(m/2), pointer array 712 is designated as the READ array and pointer array 714 is designated as the WRITE array. Step 1416 is then executed.

Figure 14B:
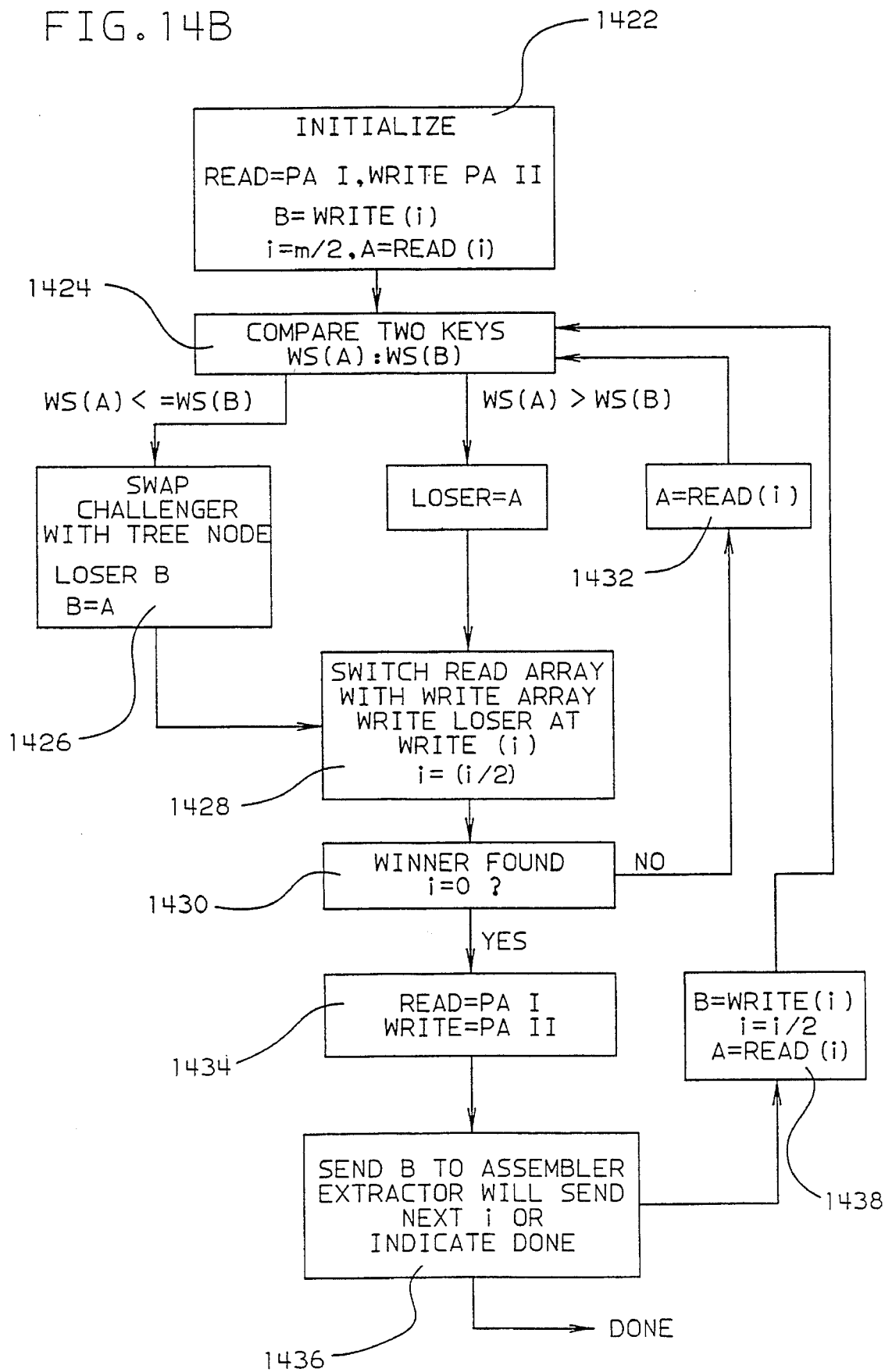

In step 1416, the value of m is checked to determine if the fill tree process is complete. When the value of m is equal to twice the width of the tree (8×2=16 in this case) then the fill process is complete. When the tree is filled, Working Store address B (the address of the first winner) is sent to the assembler function of the extractor/memory interface unit 308 and the base area is reloaded (by the extractor function) with the next key in the list from where the winner originated. The merge operation of FIG. 14B is then executed. If the fill process is not complete then step 1418 is executed.

In step 1418, the B register 721 is loaded with the Working Store address in WRITE(m) and the A register 719 is loaded with the Working Store address from READ(i). Since m=9 and i=4 (INT(9/2)) then the B register is loaded with 3 (pointer array 714, address 9) and the A register is loaded with 1. Steps 1404–1412 are then again iteratively executed for the key "C" represented by node 9.

As will be apparent from FIG. 14A, steps 1404–1418 are executed iteratively until each of the base nodes has been loaded onto the tree, all of the automatic winners have been displaced, and the first winning key is determined. FIG. 13C illustrates the state of the pointer arrays at the end of the fill tree process as determined by step 1416. As an alternative to loading the base with the next element from the list of the winner after step 1416, the base can be backfilled during the fill process by loading the next element in a list as the preceding element in that list advances onto the tree.

FIG. 14B is a flow chart illustrating the tournament tree operation. From FIG. 14B it will be apparent that the steps of the actual tree operation 1422–1438 are similar to those of the fill tree process 1402–1418. The primary difference between the two operations is in the determination of the comparison path. In the fill tree process of FIG. 14A, the tree is filled from left to right across the base by using the m pointer (as shown in step 1414). In contrast, during the tree operation of FIG. 14B, the next key compared, and therefore the path of comparison, is determined by the previous winner. Since the extractor keeps track of the winner's list of origin, the proper base starting point (i) is sent by the extractor each time a new winner is determined. As with FIG. 14A, all division in FIG. 14B is integer division, (i.e. only the integer portion of the result is examined).

During the tournament tree operation, if a list empties the extractor can either stop the sort/merge unit or load an automatic loser onto the tree. Which option is selected depends on the type of merge being executed.

Where the merge operation is intended to run until all lists are empty, then an automatic loser is loaded, Otherwise, the merge would be stopped. When an automatic loser becomes a winner (because the only keys left on the tree are automatic losers) then the merge is complete. Where two keys are equal, one can be arbitrarily chosen as the winner (e.g. the key from Working Store address A always wins over an equal key from Working Store address B).

Join operations are performed using the sort/merge join algorithm. Joining two tables requires that they are both in the same sorted order (e.g. ascending or descending) and that the columns on which the join is defined are identically formatted. The sorted order depends on the join criteria. When equal to, greater than, or not equal to criteria is specified, ascending order is used. When less-than is the specified criteria, a descending order is used. The lists are, therefore, first sorted using the sort/merge unit 302 and then joined.

The join is executed by merging a first list L1 with a second list L2 until the join criteria is met. When equal to, greater than, or not equal to criteria is specified, an ascending merge is performed. When the less-than criteria is specified, a descending merge is performed. When the join criteria is met, the record ID of the corresponding keys are written as a pair to a result area of the Working Store 312. Once the key IDs have been written to the Working Store 312, the join is continued by stepping through the first list L1 one key at a time and comparing to a window of keys in the second list L2. The window is defined by all of the keys in the L2 list that meet the join criteria when compared to any one element of the L1 list. For key L1(i) there are L2(j) to L2(k) keys that match (where j is less than or equal to k). Matching keys have their record IDs written as a pair to the result area of the Working Store 312. When the end of the window is reached (i.e. the join criteria is no longer met), the first list L1 list is stepped to L1(i+1), the second list L2 is reset to L2(j) (i.e. the beginning of the window). The join operation is then continued as a two way merge of the first and second lists until the join criteria is again met, at which point a new window is created.

A pseudocode embodiment of the join operation is illustrated below:

| | | |
|---|---|---|
| Two way merge L1(i);L2(j) | ; | Perform two way merge. |
| On L1(i), L2(j) meet selected join criteria (any of >,<,=,NE) | ; | If join criteria is met perform the following steps. otherwise continue 2-way merge. |
| Output L1(i), L2(j) | ; | Write L1(i), L2(j) record IDs to Working Store. |
| k=j | ; | Initialize pointers. |
| k=k+1 | ; | Increment window pointer. |
| compare L1(i):L2(k) | ; | Check if join criteria is met. |
| if join criteria is met output L1(i), L2(k) and go to 40 | ; | |
| i=i+1 | ; | |
| Return to 5 | ; | Resume Merge |

A more detailed description of sort/merge/join algorithms can be found in C. J. Date, *An Introduction to Database Systems,* Addison-Wesley Publishing Company, Reading, Mass., 1983, the full text of which is incorporated by reference herein as if printed in full below.

The sort/merge unit 302 performs the initial comparison of the join. Other predicate terms are performed by the Predicate Evaluator 304 (FIG. 3). For this reason, the most restrictive predicate in the join should be performed by the Sort/Merge Unit 302, and the remainder performed by the Predicate Evaluator 304. This method will result in the fastest processing and the smallest number of predicates being evaluated by the Predicate Evaluator 304. For multiple predicate joins the Sort/Merge Unit 302 evaluates the first predicate and then tells the Predicate Evaluator 304 to evaluate the remainder.

The set operations union, intersection, and difference are also performed using the sort/merge algorithm. The difference between these and the join operation is the way the output record is selected and constructed. Join combines the two records into one record that contains columns from both records. Set operations are defined only on databases that have the same format (i.e. the same number and types of columns). The outputs of the set operations union, difference, and intersection have the same format as the inputs. Cross product is the exception to this rule. Since the cross product is essentially a unrestricted join, all records in one database are joined with all of the records in the other database.

The union operation creates an output table that contains one copy of all of the unique records in the two input tables. That is, if the comparison operation results in not-equal, both input table records are written. If the two input records are equal, then only one is written to the output table (from either table). A pseudocode embodiment of the union operation is illustrated below:

UNION OPERATION
COMPARE L1(i):L2(j)

IF L1(i)<L2(j), OUTPUT L1(i), i=i+1
IF L1(i)>L2(j), OUTPUT L2(j), j=j+1
IF L1(i)=L2(j), OUTPUT L1(i), i=i+1, j=j+1
CONTINUE

The intersection operation writes only one copy of the equal records, while the difference operation writes only the record from the A table when the comparison is unequal. Thus, the difference between all three set operations is which condition causes the output to be written. Pseudocode embodiments of the intersection and difference operations are illustrated below:

INTERSECTION OPERATION
COMPARE L1(i):L2(j)
IF L1(i)<L2(j), i=i+1
IF L1(i)>L2(j), j=j+1
IF L1(i)=L2(j), OUTPUT L1(i), i=i+1, j=j+1
CONTINUE
DIFFERENCE OPERATION
COMPARE L1(i):L2(j)
IF L1(i)<L2(j), OUTPUT L1(i), i=i+1
IF L1(i)>L2(j), j=j+1
IF L1(i)=L2(j), i=i+1, j=j+1
CONTINUE

A further improvement to the sort/merge Unit 102 applies hardware codeword techniques (also referred to as offset value coding) to a conventional replacement-selection type tournament sort, of the type described in chapter 5.4 of *Sorting and Sort Systems* by Harold Lorin (previously incorporated by reference herein). The use of offset value coding reduces the number of bytes compared to determine the order between keys.

The offset value coding hardware identifies the offset of the word in the key where the comparison operation resulted in a difference from the previous winning key. Each codeword comprises the offset and the word. Since codewords are always based on the previous winning key, the codewords need only be compared to determine if a key is larger than another key. If the keys are equal, then both keys are scanned further (from left to right) to determine where a difference exists or if the keys are exactly equal.

A discussion of the application of offset value coding to replacement selection sorting can be found in IBM Technical Disclosure Bulletin, Vol. 20, No. 7, December 1977, pp 2832–2837 which is in its entirety, incorporated by reference herein as if printed in full below.

The use of codeword comparisons (rather than direct key comparisons) has the advantage that the leftmost portion of the keys are only compared once during the sort process. This is so, because the codeword maintains the position of the difference from the last comparison operation. Thus, a minimum number of compares is performed, improving performance over algorithms which must compare the leading words of the keys during every key compare.

Figure 11:
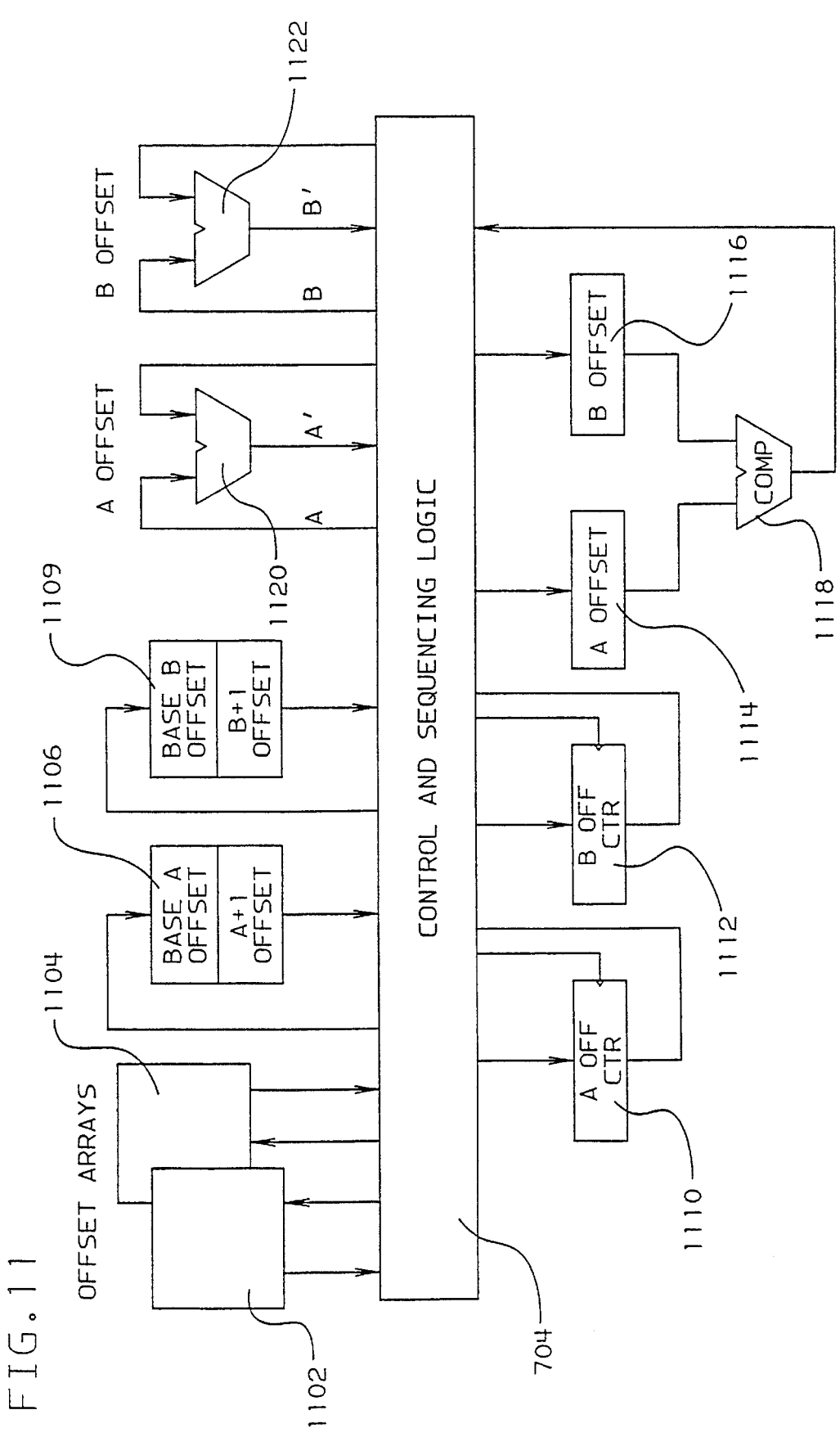
FIG. 11 is an illustration of the hardware additions to the Sort/Merge Unit of FIG. 7 which implement Tournament Tree Codeword Techniques.

FIG. 11 shows an embodiment of the sort/merge unit which uses additional hardware to apply codeword techniques to a replacement/selection type tournament sort. It should be understood that the hardware of FIG. 11 is used as an addition to the hardware of FIG. 7.

In order to implement codeword techniques, two 8K by 4-bit offset arrays 1102, 1104 are provided which are concatenated with the pointer arrays 702, 704 of the Sort/Merge Unit embodiment of FIG. 7. The codeword tournament tree sort hardware of FIG. 11 also includes Base A and Base B offset registers 1106, 1109 which complement the A and B address registers 706, 708 in the embodiment of FIG. 7. In addition to holding the address of the offset for the current key, the BASE A and BASE B address registers have provision for storing, in the same read cycle as the A and B base offsets, the A+1, B+1 offsets (i.e. the offsets of the next two keys to be compared).

A and B offset address counters 1110, 1112 contain the Offset Array address for the codeword of the current keys being compared. The the A and B offset address counters 1110, 1112 are loaded with the base key addresses from the BASE A Offset and BASE B Offset registers 1106, 1109 and are incremented by one quadword address at a time in order to compare the offsets of quadword size sections of multiquadword keys. It should be understood that this feature is used since the Working Store 312 (in the preferred embodiment) is accessed in quadwords, whereas keys can be larger than a quadword.

A and B Offset Registers 1114, 1116 contain the offset of the current keys (or quadword size key sections) being compared. These offsets are compared by a comparator 1118 which informs the control logic whether the two keys differ. Where the offsets are not equal, the higher value offset will win and it will not be necessary to compare the keys. Where the offsets are equal the quadwords of the two keys addressed by the offsets are compared to determine the winner. If the two quadwords compared are equal (in a multiquadword key), the control and sequencing logic 704 will increment the A and B offset counters so as to cause the next two quadwords of the corresponding keys to be compared. The sequencing logic 704 will continue to increment the A and B offset counters until the corresponding quadword key compare determines a winner.

The embodiment of FIG. 11 also includes two multibit adders 1120, 1122. The adders 1120, 1122 add the offsets to the A and B addresses so that the keys can be compared at the point of offset.

h. Hash Generator

The hash generator (DBHG) 306 is a hardware element that takes 8 byte keys and creates a hash code from their contents. The hash code is a 9-bit value that is created by adding 8 sub-codes. The hash code generator is used for the EQUIJOIN processing, because similar keys will be lumped into the same hash-code value bucket. By lumping similar keys into buckets, the hash-code join algorithm narrows the scope of the join algorithm discussed earlier, since the sort/merge join algorithm only needs to be performed on each hash code bucket. Hashing and hash codes are discussed in detail in the book *THE ART OF COMPUTER PROGRAMMING, Volume 3, Sorting And Searching,* by Donald E. Knuth, Published by Addison-Wesley Publishing Company (copyright 1973), which is incorporated by reference in its entirety as if printed in full below.

To perform the hash code version of the EQUIJOIN, both tables must be hashed to create buckets for each code. A bucket is a group of keys for which the application of hashing has resulted in the same value. Once the hashing of the keys in both tables is done, the identical buckets from both tables are sorted by key, then joined as discussed earlier. In most cases, hashing the tables results in hash-code buckets that are less than the size of the Working Store 312. These tables can then be loaded into WS, sorted, and joined without any further system memory accesses. Thus, the number of memory operations is reduced because the merge step of the sort is not required on these hash-code buckets. The performance of the EQUIJOIN is improved significantly due to the reduction in system memory accesses.

Figure 15:
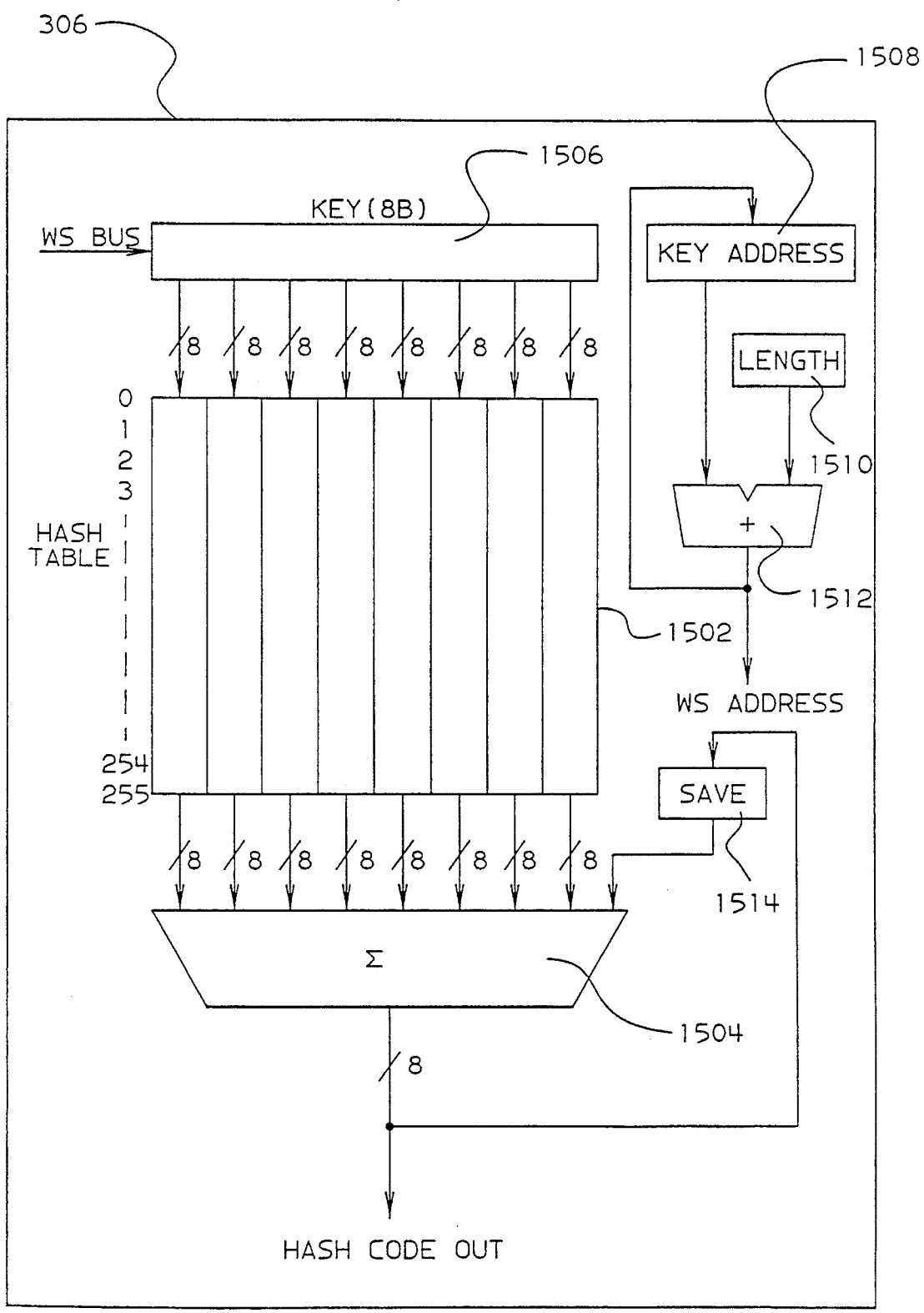
FIG. 15 is a more detailed diagram illustrating the structure of the Hash-code Generator (DBHG) of FIG. 3.

The DBHG hardware will be described with reference to FIG. 15. The DBHG hardware includes a 256×8 look-up table 1502 of 9-bit hash code values and an eight input adder 1504. There is one 256 element array of codes for each byte in the input key. The input key, held in a register 1506, indexes the array 1502, resulting in one of the 256 codes being selected. The sum of the 8 codes generated in this way is the hash-code bucket number for this key. The key is written to this bucket and then the next key is read.

Longer keys are handled by dividing the key into 8-byte long subkeys and generating a hash code for each subkey. All subkey hash codes are added together to form the final hash code. In order to accommodate keys longer than 8 bytes, the Hash Code Generator 306 is provided with a key address register 1508, a length register 1510, an adder 1512 and a save register 1514. Prior to the commencement of hashing, the save register 1514 is initialized to zero and the length register is loaded with the subkey length (8 bytes in the embodiment of FIG. 15).

When a key is to be hashed, its base Working Store address is loaded into the key address register 1508. The first eight bytes of the key are then loaded into the key register 1506. The resulting hash code is held in the save register 1514. Once the first eight byte portion of the key has been processed, the subkey length is added to the base address by the adder 1512 and the next eight byte subkey is read from the Working Store 312 and processed. This procedure is performed iteratively until the hash codes have been generated for each eight byte subkey.

The resulting hash codes from each subkey are added, cumulatively as they are generated, in the save register 1514. At the end of the hashing operation for all of the subkeys, the save register 1514 will contain the hash code for the complete key.

Once all of the keys from both tables have been lumped into hash-code buckets, then each bucket is joined using the sort/merge join algorithm.

All of these operations are performed by the Hash-Code Generator 306, the Extractor/Memory Interface Unit 308, and the Control Processor 310. The Hash-Code Generator 306 maintains mappings for the 256 hash code buckets and the two input tables. Tables are read in as blocks, then hashed, and written out by giving the Extractor/Memory Interface Unit 308 the hash-code bucket and the key. A mapping table in the extractor/memory interface unit 308 keeps track of where the bucket is located in system memory and how to increment the location once the store is complete. Thus, the entire hashing operation can execute with only minimal intervention of the control processor 310.

Once the hashing is complete, the Control Processor 310 initiates a sort/merge join on each of the buckets. Each pair of buckets (one from each of the two input tables that have the same hash-code) is fetched from system memory to the Working Store 312 and then the Sort/Merge Unit 302 is setup and started to perform the sort/merge join. The sort/merge join executes as before, although it has smaller tables to join than before.

The following is the sequence of operation of the hash join:

1. Fetch a block of records from Table A.

2. While the next block is being fetched, hash the previous block and then write each record to its appropriate hash-code bucket.

3. Repeat steps 1 and 2 until the entire Table A has been hashed.

4. Do steps 1, 2 and 3 for Table B.

5. Set i equal to zero.

6. Perform the sort/merge join algorithm on HA(i) and HB(i).

7. Increment i by 1 and go back to step 6 if i=256.

8. Done.

i. Extractor/Memory Interface Unit

The extractor/memory Interface Unit (DBEM) 308 (FIG. 3) is the component of the Database Engine which fetches and stores data from/to system memory (main storage 410 or page storage 412; FIG. 4). The extractor/memory interface unit 308 has two primary functions: the extraction/assembling of fields from the data being fetched/stored into system memory, and the maintenance of the mapping information for the lists of records used during sorting and merging operations.

In sorting and database applications, the sort key or field on which a search is defined are often spread throughout the records and must be extracted into a useable format before the operation can proceed. For sorting this means getting each key field and concatenating them in precedence order so that they can be treated as one large key. For database processing, the columns of a table that are being searched or selected must be extracted from the rows so that they can be processed.

Field extraction is done for several reasons in sorting and database processing. Among these reasons are:

1. To create a usable sort key by combining the primary and secondary key field into one key.

2. Needed fields are extracted so that only the fields required for the sort, search, and output generation are carried. Removing unneeded fields reduces both the memory traffic and the amount of memory used for the operation.

3. To pick subsets of fields so that pattern matching can be performed more easily.

4. To put fields in correct order for the output phase of the processing, which may conflict with the key order or require a different set of fields than the search or sort itself. This function is sometimes called field assembly, although it is essentially the same as the extraction function.

In many conventional software applications, the extraction function is performed by a series of "Move Character Long" or MVCL instructions. One MVCL is typically performed for each field in the record that is to be extracted. The fields are all brought together in their extracted form before the actual search or sort occurs. Moving all the data is inefficient because of the amount of storage accesses that occur. In addition to the pre-extraction memory accesses, the extracted fields are conventionally re-fetched to perform the sort or search operation. If the fields could be extracted and sorted (or searched) in one operation the performance would be greatly improved because the number of memory accesses would be halved.

To get data from records created by DB2 into a more efficiently compared form, the extraction function of the Extractor/Memory Interface Unit 308 reorders the fields as they are fetched into a compact form. The extraction process causes fields to be oriented in the Working Store 312 (FIG. 3) with fixed length and stride.

The mapping function of the extractor/memory interface unit 308 uses a plurality of entries (mapping table) comprising Working Store addresses, lengths, counts, and system memory addresses. Each of the lists being fetched during an N-way merge or a sort operation have a entry in the mapping table. When the sort/merge unit 302 wants a new entry from a list, it sends the Extractor/Memory Interface Unit 308 the ID number of the list having the entry. The Extractor/Memory Interface Unit 308 takes this ID number and looks it up in the mapping table to find out all the information needed to fetch the field, including the extraction information. The same format is also used for output records, a read/write (R/W) flag indicates the direction of transfer.

Figure 16:
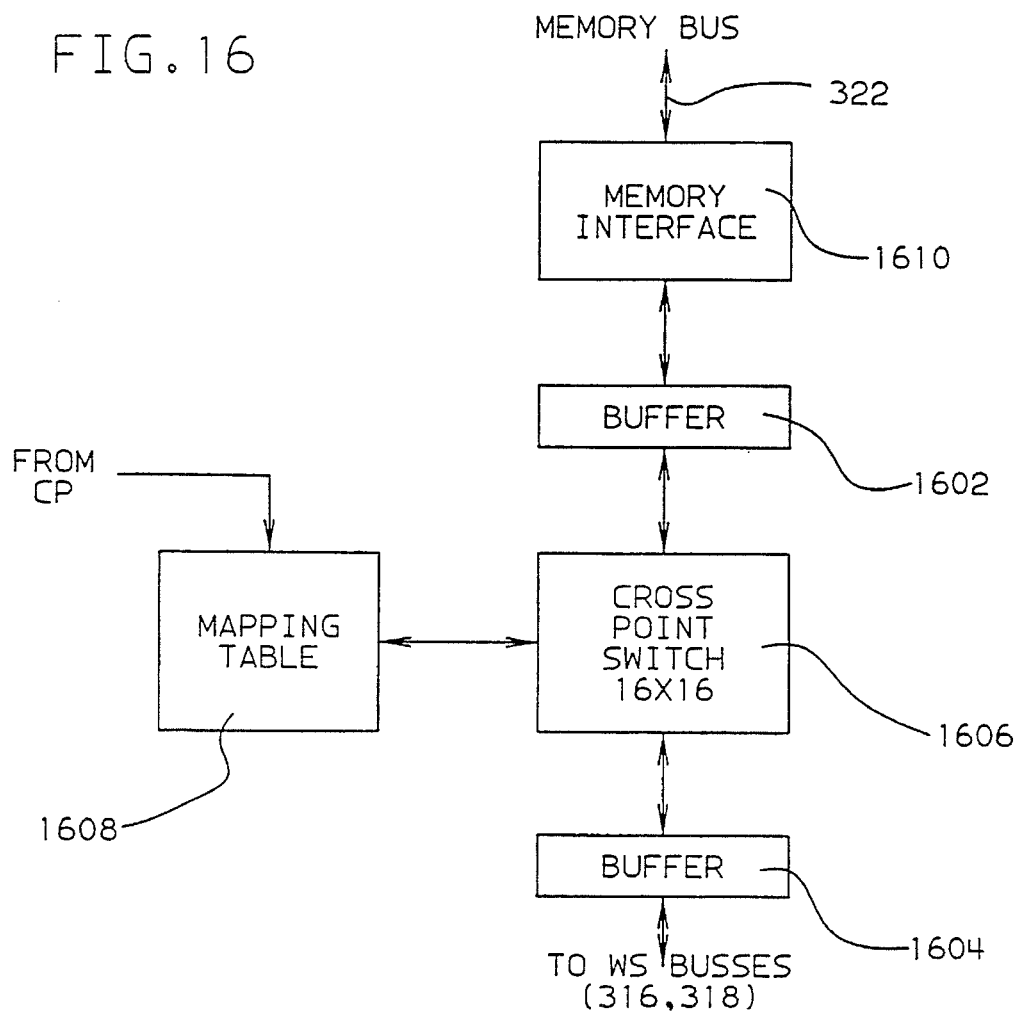
FIG. 16 is a block diagram of the Extractor/Memory Interface Unit (DBEM) of FIG. 3.

The structure and operation of the extractor/memory interface unit will be better understood by reference to FIG. 16. The Extractor/Memory Interface Unit includes a memory buffer 1602, a Working Store buffer 1604, a crosspoint switch 1606, a mapping table 1608 and a memory interface 1610 which interfaces with the system memory (main Store 410 and page storage 412; FIG. 4) via the system memory bus 322. As records are fetched from the system memory (via the memory interface 1610), they are loaded into the memory buffer 1602 and written into the Working Store buffer 1604 (via the crosspoint switch 1606) a quadword at a time. Each quadword is then transferred in its extracted format into the the Working Store 312 (FIG. 3) for processing.

The reverse process happens on the Working Store to system memory operations. During Working Store to system memory operations, fields are assembled from the Working store buffer 1604 using the crosspoint switch 1606 and written into the system memory.

During merge operations the entries in the mapping table 1608 each contain main memory/Working Store address pairs, key lengths, and counts of each list being merged so that the Control Processor 310 does not have to be involved in the fetch process. When the Sort/Merge unit 302 needs another element from a list, it informs the Extractor/Memory Interface Unit 308 (via the control bus 320, FIG. 3) which list ID to fetch the key from. The Extractor/Memory Interface Unit 308 reads the appropriate mapping table entry to determine where the list is stored in main memory and fetches it accordingly. The fetch process can occur concurrently with the sort/merge that is being processed out of the Working Store 312, stealing cycles on the Working Store bus 316, 318 when a Working Store access is required.

Figure 17B:
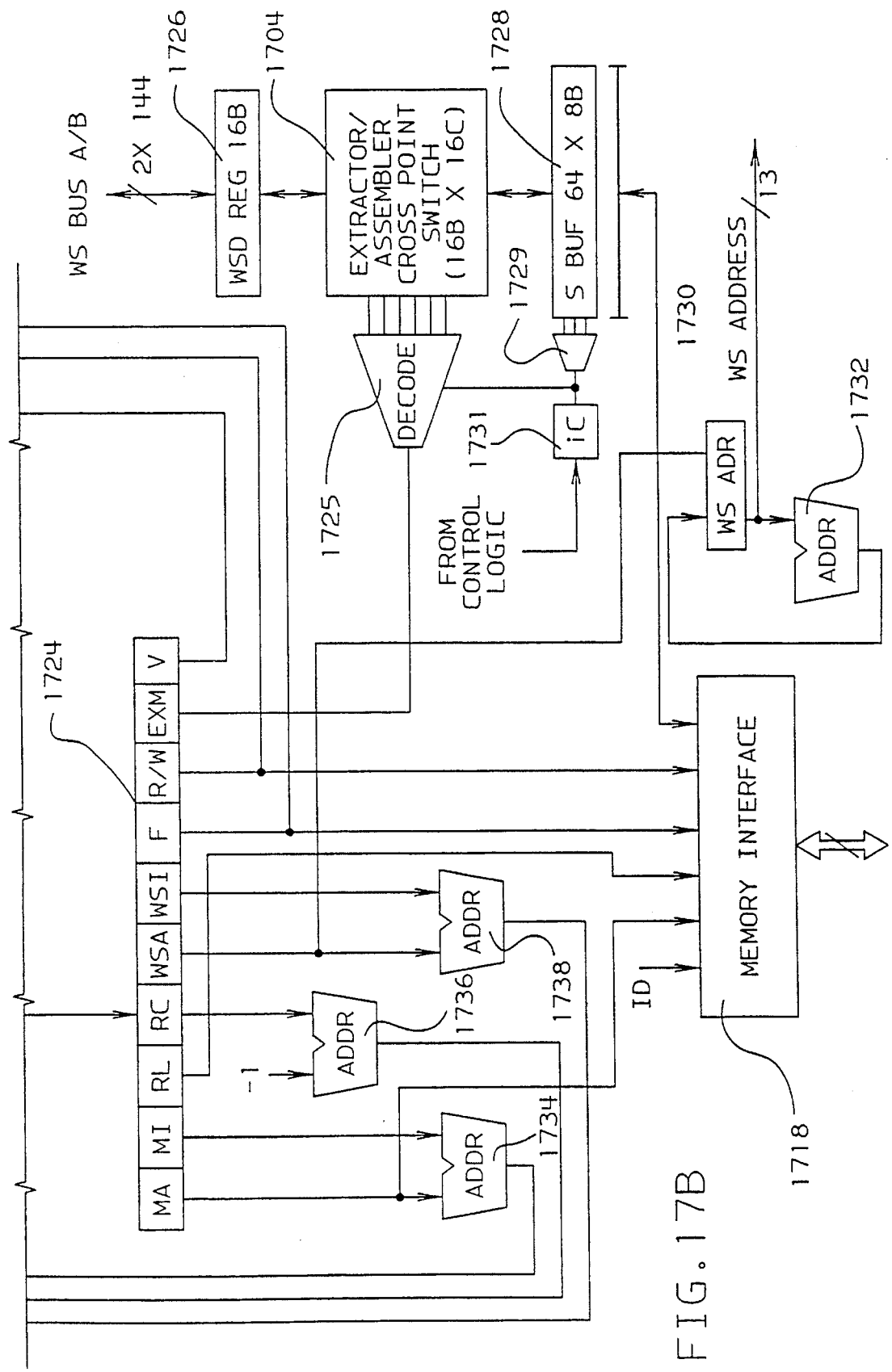

FIGS. 17A/17B are top and bottom halves of a more detailed diagram of an embodiment of the Extractor/Memory Interface Unit 308. As previously described, the Extractor/Memory Interface unit 308 includes a mapping table 1702. The mapping table 1702 (which corresponds to the mapping table 1608 of FIG. 16) is a table of information which maps system memory addresses to Working Store addresses. The mapping table 1702 includes one entry for each record to be processed by the database engine 300. The mapping table 1702 is loaded at the beginning of a request by the Control Processor 310 and updated each time a record is transferred. The mapping table 1702 is reloaded by the Control Processor 310 as needed.

The crosspoint switch 1704 (which corresponds to the crosspoint switch 1606 of FIG. 16) provides for the reordering of bytes during the transfer of data. The crosspoint switch 1704 assembles the bytes into records under the control of the control logic 1706 (described later).

The request queue 1708 stages requests for transfers until a currently executing transfer is complete. The request queue 1708 is loaded by the other processing elements in the Database Engine 300 and is emptied as their requests are processed by the extractor/memory interface unit 308. Each element in the request queue 1708 includes a map table entry identification number (ID) 1710, the number of records requested (A) 1712, and a list number (L) 1714 which is returned to the requestor. The F field 1716 is used for status flags as needed.

The memory interface 1718 provides the interface and communication to the system memory bus 322. All data read or written to the system memory (main or page storage) goes through this element.

The mapping table input register (MTIR) 1720 is a staging register for the mapping table 1702. The mapping table input register 1702 can be loaded from either the control bus 320 or internally during the processing of records.

The mapping table output register (MTOR) 724 holds the mapping table entry that is currently being processed. The records in each entry include:

a. the system memory address (MA) of the record to be processed;

b. the system memory increment (MI) to be used to find the next record to be processed;

c. the record length (RL);

d. the record count (RC), i.e. the number of records to be processed by this mapping table entry. The record count is decremented each time a record is processed until it reaches zero, at which time no further records will be processed by this entry. A new entry must be reloaded to continue processing;

e. the Working Store address (WSA), i.e. the address of the record in the Working Store 312 where data is to be read or written;

f. the Working Store increment (WSI) to be used to find the next record to be read or written into the Working Store 312;

g. flags (F) (preferably 1 byte) which indicate processing options;

h. read/write flag (R/W) which specifies whether the operation is a read of the system memory (extraction) or a write to the system memory (assembly);

i. an extraction mask (EXM) which specifies the bytes that are to be processed through the crosspoint switch. The bits in the extraction mask indicate which switches are to be activated in the crosspoint, providing any byte to any byte connectively through the switch. The EXM field controls the connectivity state of each of the internal switches in the crosspoint switch, via a decoder 1725;

j. a valid bit (V) which indicates that the mapping table entry is valid.

The Working Store data register (WSD REG) 1726 is used to stage data to and from the Working Store. The storage buffer (SBUF) 1728 is used to stage data to and from the memory requestor. Finally, the Working Store address register (WS ADR) 1730 holds the current Working Store address (modulo 8) being processed. This address is incremented by 1 for each EXC iteration, using the adder 1732.

A counter 1731, under control of the control logic 1706, keeps track of and selects (via the SBUF decoder 1729) the quadword in the storage buffer 1728 being reordered through the crosspoint switch 1704. The output of this counter 1731 is also used as a control input for the cross point switch decoder 1725 so that it selects the appropriate portion of the extraction mask for the selected quadword.

The control logic 1706 controls the operation of each of the other elements in the extractor/memory interface unit.

The control logic 1706 can be a microprocessor running under microcode control, a conventional microsequencer, or hardwired logic in the form of an application specific integrated circuit (ASIC).

Adders 1734–1738 are provided to manipulate various fields in the mapping table entries as they appear in the mapping table output register 1724. These manipulations include adding the memory increment (MI) to the memory address (MA), decrementing the record count (RC) and adding the Working Store increment (WSI) to the Working Store address (WSA).

Figure 18A:
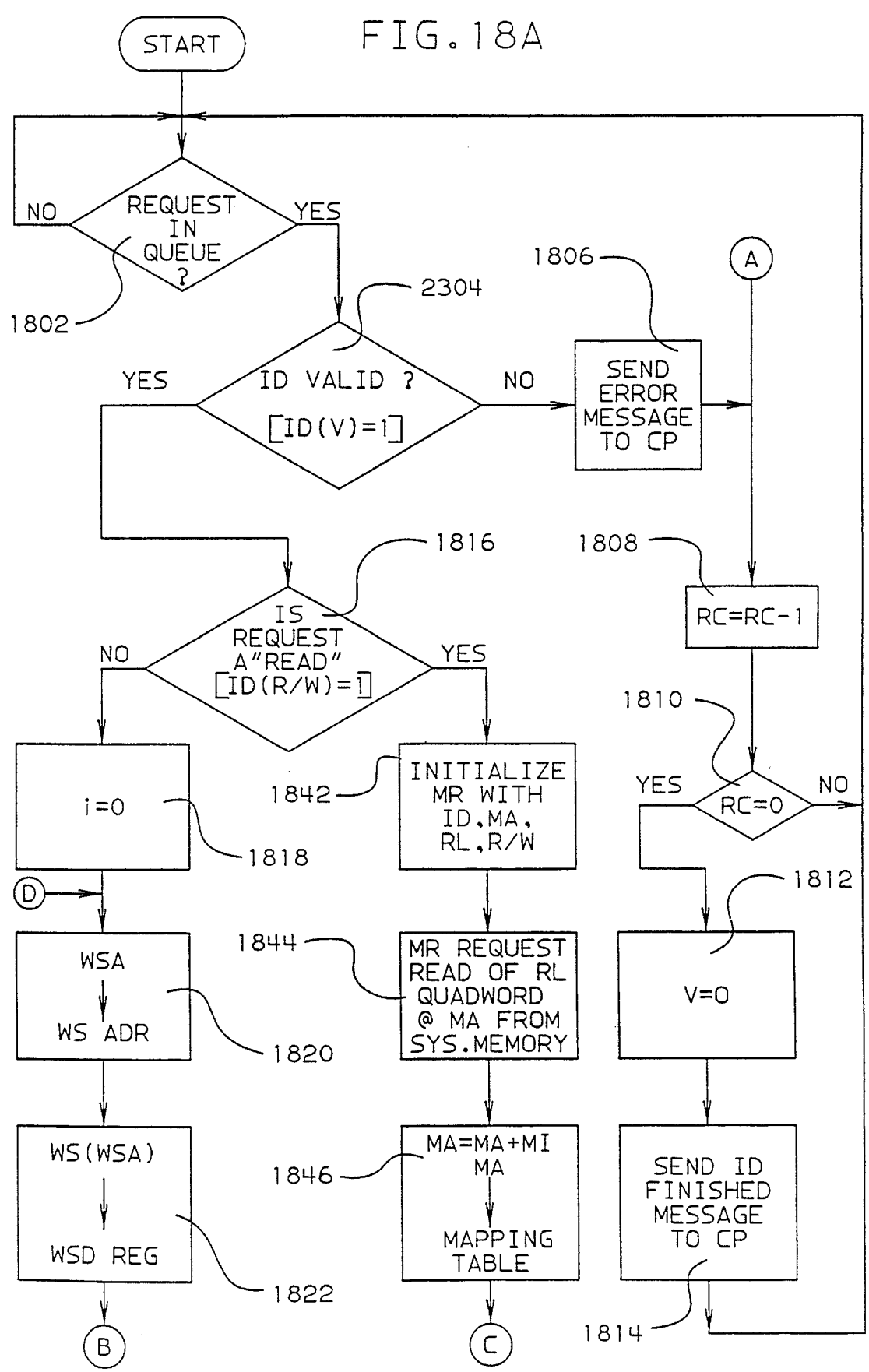
Figure 18C:
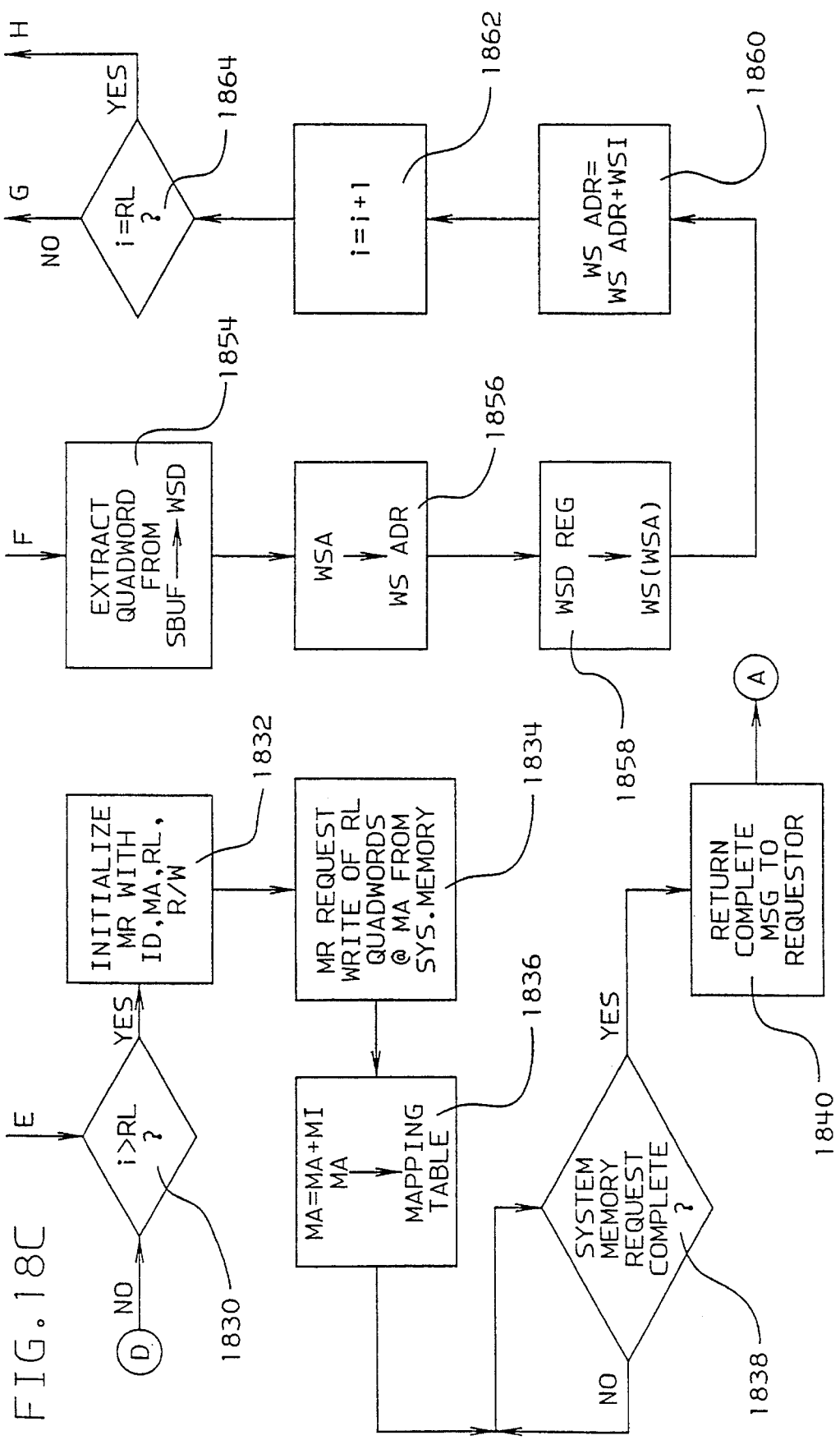

The operation of the Extractor/Memory interface unit will now be explained by reference to FIGS. 18A, 18B and 18C. FIGS. 18A, 18B and 18C are a flow chart of the operation of the memory interface/extractor unit. The described operations are performed under the control of the control logic 1706. The flowcharted algorithm can be implemented as a microcoded program or as part of the control logic circuitry in an ASIC.

As previously explained, before a request is processed by the Extractor/Memory Interface Unit 308, the Control Processor 310 loads the mapping table 1702 with the mapping table entry information required to process a given database command. The mapping table 1702 is loaded by the Control Processor 310 by way of the control bus 320 and the mapping table input register (MTIR) 1716. Each request for extraction operates on a group of records in the system memory. The records in a given group are presumed to have a fixed record length (RL), and a fixed stride or increment (MI) between them. Similarly, assembled groups of records are written back into the system memory with fixed record length and stride.

For each request for extraction or assembly, the control processor 310 assigns an ID number which identifies a corresponding entry in the mapping table 1702 and appropriately sets the read/write bit. The control processor 310 also builds and loads the extraction mask (EXM) so as cause the cross point switch 1704 to carry out a given extraction/assembly request. The memory address (MA), the memory increment (MI), the record count (RC), and the record length (RL) are provided to the control processor 310 as part of the database engine command block, received from the host processor.

For extraction, the Working Store address (WSA) and the Working Store increment (WSI) are determined by the control processor based on the record lengths of the extracted records and conventional memory space allocation methods. For assembly, the Working Store address and increment are determined from the actual location and stride of the records as they appear in the Working Store 112.

In the idle state 1802, the Extractor/Memory Interface Unit 308 waits for the Control Processor 310 to place a request into its request queue 1708. When the control logic 1706 determines that a request has been entered into the queue 1708, it examines the ID 1710 and then reads the validity bit (V) of the entry corresponding to the ID, in the mapping table (which is loaded with the entry by the control processor 310 along with the request) to determine if the request is valid (Step 1804).

If the validity (V) bit is not set (V=0) the control logic 1708 sends an error message to the Control Processor 310 (Step 1806) and decrements the record count (RC) using the record count adder 1736 (Step 1808). The control logic 1706 then determines if the record count is 0 (Step 1810). If the record count is not 0, the control logic 1706 reenters the idle state (Step 1802) and waits for the next record. If the record count is 0, the control logic resets the validity bit to 0 (Step 1812), sends a FINISHED message to the control processor 310 and reenters the idle state (Step 1802) to wait for the next request. It should be understood that the validity bit is reset to 0 in step 1812 to handle the cases where this step is executed as a result of an entry into the algorithm at point A rather than due to an invalid ID entry.

If the validity bit is set (V=1), the control logic 1706 reads the R/W bit of the entry (Step 1806) to determine whether the request is a READ (extraction) or a WRITE (assembly).

If the request is a write, the Extractor/Memory Interface Unit 308 begins the assembly process. As a first step in the process, the control logic 1706 loads the i-counter 1731 with an initial value of zero (step 1818). The Working Store address (WSA) from the entry in the mapping table output register 1724 (which is the entry corresponding to the ID of the request) is then loaded into the Working Store address register 1730 (Step 1820). That being accomplished, the Working Store data from the Working Store address (held in WS ADR reg. 1730) is loaded into the Working Store data register (WSD REG) 1726 (Step 1822). The control logic 1706 then sets up the cross point switch 1704.

The cross point switch 1704 is set up by the extraction mask field (EXM) in the mapping table output register 1724 (Step 1824). One section of the extraction mask is provided for each quadword in the record. Each section is individually accessed by indexing the mask with the i counter. The mask section for a given quadword is decoded and the decoded value sets up the crosspoint switch.

Once the crosspoint switch 1704 has been set up for the desired connectivity, the data from the Working Store data register 1726 is assembled into the store buffer (SBUF) 1728 (Step 1826). The i counter 1731 is then incremented (Step 1828) and the i counter value (i.e. the quadword count) is compared to the record length (RL) in the mapping table output register 1724 to determine if there are any more quadwords in this record that need to be processed (Step 1830).

If there are more quadwords to be processed, the control logic 1706 repeats the sequence of steps 1820–1830 for each quadword. If there are no additional quadwords to be processed, the control logic 1706 initializes the memory requestor 1718 (step 1832) by providing it with the record ID, the memory address (MA), the record length (RL) and the read/write control bit (R/W) from the mapping table output register 1724. Once initialized, the memory interface 1718 requests a system memory write of RL quadwords to system memory starting at system memory address MA (Step 1834). The memory address (MA) is then incremented by the memory increment (MI) using the address adder 1734, and the entry with the updated MA is written back into the mapping table 1702 via the mapping table input register 1716. The updated entry is written into the mapping table 1702 in preparation for the processing of the next record to be processed under the request ID (Step 1836).

Once the entry in the mapping table has been set up for the next record, the control logic 1706 enters an idle loop (Step 1838) to wait for a signal from the host system, via the memory requestor 1718, that the memory request has been completed. When the control logic 1706 receives the request complete signal, it resets the memory requestor (Step 1840) and reenters the algorithm at point A.

A read request (extraction) is handled in a reverse manner to a write request (assembly). Upon determining that the request is a READ (step 1816), the control processor initializes the memory interface the the record ID, memory address (MA), record length (RL) and read/write bit (R/W) (Step 1842). The memory interface then requests a read from system memory of RL quadwords starting at system memory address MA. The memory increment is then added to the memory address to prepare for the processing of the next record and the updated entry is rewritten into the mapping table (Step 1846). The control logic 1706 then enters an idle loop to wait for the memory request to be complete (Step 2348).

Once informed that the memory request is complete, the control logic 1706 loads the store buffer 1728 with the data received from the memory interface 1718 and resets the i-counter 1731 to zero (Step 1850). The control logic 1706 then sets up the crosspoint switch with the extraction mask (EXM) (Step 1852) in a similar manner to that described for step 1824. The quadword from the store buffer 1728 is then extracted via the crosspoint switch 1704 to the Working Store data register 1726 (Step 1854).

Once the record data has been extracted into the Working Store data register 1726, it is written to the Working Store 312 (FIG. 3). This is accomplished by writing the Working Store address (WSA) from the mapping table output register 1724 into the Working Store address register (1730) (Step 1856) and then writing the Working Store data from the WSD register 1726 into the Working Store 312 at the Working Store address in the Working Store address register 1730 (Step 1858).

Once the first quadword has been written to the Working Store 312, the control logic 1706 sets up the Extractor/Memory Interface Unit to accommodate the next quadword in the record. Using the WS address adder 1732, the Working Store address is then incremented by the Working Store increment (typically one quadword) and the updated entry is written back into the mapping table 1702 (Step 1860). Further, the i counter value is incremented by one (Step 1862). If the i counter value is not yet equal to the record length (RL) in the mapping table output register 1724 (as determined by step 1864), steps 1852–1864 are repeated for the remaining quadwords. If all of the quadwords in the record have been processed, the control logic resets the memory requestor 1718 (Step 1866) and reenters the algorithm at point A to prepare for processing the next record.

j. Enhancements and Improvements

The sorting performance of the Database Engine could be further improved through several modifications to the Database Engine hardware.

Figure 22:
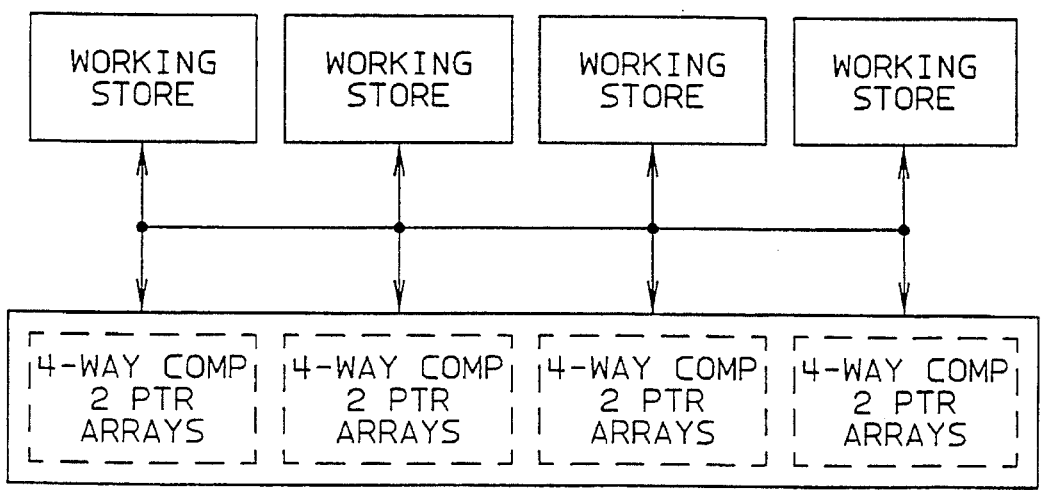
FIG. 22 is a diagram of a four pipe, 4-way comparator sort engine.

First, the Working Store 312 could be partitioned into four separate blocks of storage that allow simultaneous access for fetch operations. A sort engine with four comparators and four sets of pointer arrays could be used to simultaneously sort four blocks of keys. If the comparators are four-way comparators, i.e. four keys are compared and one key is determined to be the winner, then this engine can compare sixteen keys and produce 4 winners in one Database Engine clock cycle. Each comparator and its associated pointer arrays performs a four-way merge sort of the keys in its Working Store partition. A final pass through one of the engines (4-way merge of the 4 sorted blocks) would produces a single sorted list of keys. FIG. 22 is a block diagram of a four-pipe, four-way comparator sort engine.

Figure 19:
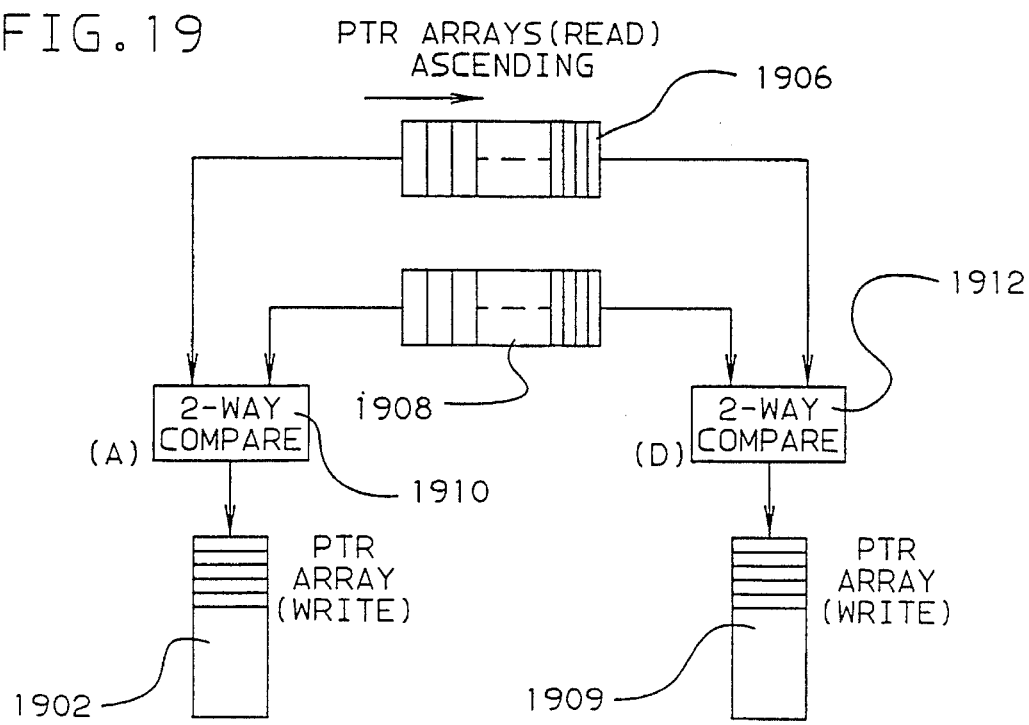
FIG. 19 is a block diagram of a DBSM modified to perform a front-back merge.

As illustrated in FIG. 19, the sort engine of the Sort/Merge Unit can also be modified to perform a front-back merge, effectively doubling the binary merge performance of the Sort/Merge Unit engine. This requires the replication of the pointer arrays 1902–1908 and the key comparator 1912. One comparator and pointer array set is initialized to start at the beginning of the lists and merge in ascending order. The other set is initialized to start at the end of the list and merge in descending order. This hardware can perform a parallel binary merge sort of the Working Store 312 in one half the time of conventional sort engines.

Figure 20:
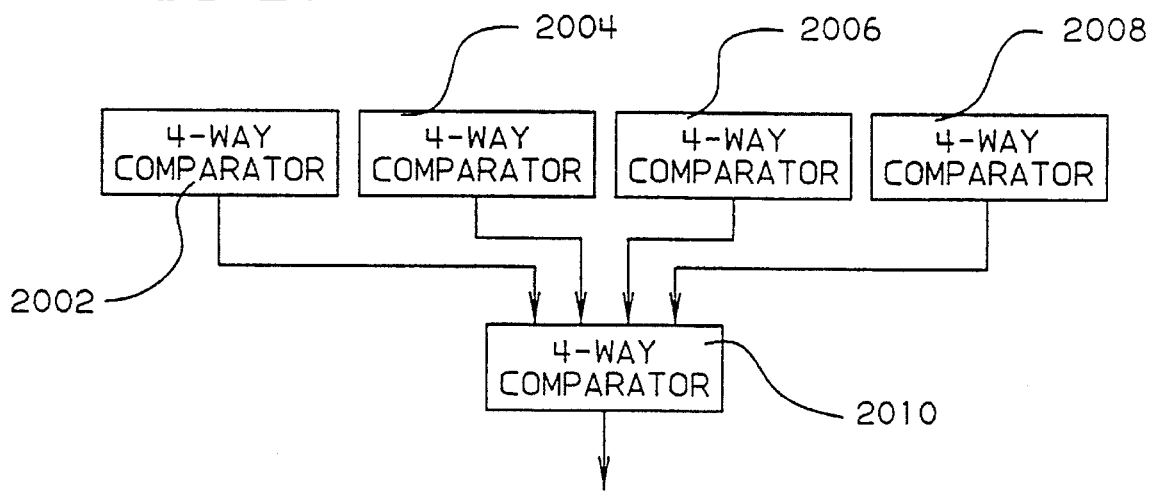
FIG. 20 is a block diagram of a 16-way merge tree with a 4-way comparator.

As described herein, the merge pass of the sort process is improved by performing an N-way merge of the keys. Since the Working Store 312 will always be limited in size by technology constraints, the sort engine must sort Working Store size blocks of keys and store them back to the system memory. When all of the blocks have been sorted, a final merge pass is used to create one sorted list of keys. A 16-way merge can be implemented with a two-way comparator and a tree of pointers and offsets (codewords). Since it is a two way comparator, the tree is 4 levels deep and the merge produces a result in, at most, every 4 cycles. A more efficient method is to use the 4-way comparators as illustrated in FIG. 20 and create a 16 way merge tree out of five 4-way comparators 2002–2010. The performance of such a tree is one result every two cycles. Thus, 16 lists of N keys can be merged in 2*16*N=32N cycles (minimum) compared to the 4*16*N=64N cycles for the 2-way comparator and a 16-way merge.

Figure 21:
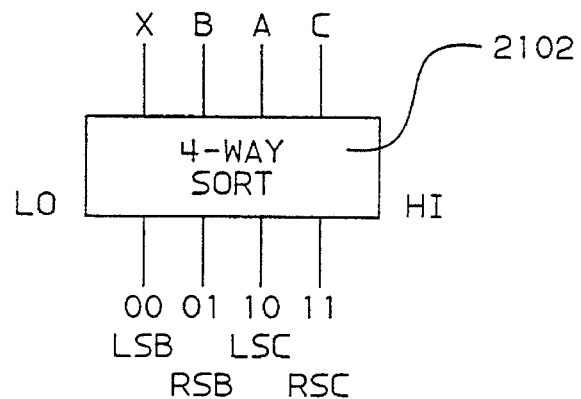
FIG. 21 is a diagram of a 4-way merge sort comparator which produces an ordered list of pointers to four input keys.

FIG. 21 shows a 4-way comparator 2102 which does not produce a winning key, but produces an ordered list of pointers to the four input keys. The output is four two-bit pointers which order the input words in either ascending or descending order. With the addition of pointer arrays and control logic as used in the sort/merge unit (DBSM) 302, the outputs can be used to control the update of the pointer arrays, reordering 4 pointers per cycle. Thus, four keys can be sorted in one cycle as compared with one key per cycle in the embodiment of FIGS. 7 and 11. This technique could be used to enhance the performance of the binary merge sort by partially pre-sorting the data. Thus, the binary merge sort can start with a list length (p in FIG. 10A) of 4, eliminating two passes through the data.

The foregoing description of the preferred embodiments of the invention have been provided for the purposes of example and description. Those skilled in the art will understand that many variations and modifications to the described embodiments that fall within the spirit and scope of the invention. It is intended that the scope of the invention be limited only by the claims.

Having thus described our invention, what we claim as new and desire to secure by Letters Patent is:

1. An apparatus for realigning database fields, comprising:

mapping table means comprising a plurality of entries, each of the entries corresponding to a plurality of database records, wherein each of the entries comprises:

a data realignment mask indicative of at least one byte within each of said plurality of database records;

a first address of the database record in a first memory, said first address representing a source for said at least one byte within each of said plurality of database records; and a second address in a second memory, said second address representing a destination for said at least one byte within each of said plurality of database records;

memory request means coupled to the mapping table means for reading one of the plurality of database records from the first memory address;

first storage means, coupled to the memory request means, for storing the one of the plurality of database records;

crosspoint switching means, coupled to the first storage means and the mapping table means, for realigning data from the one of the plurality of database records responsive to said data realignment mask; and second storage means, coupled to the crosspoint switching means, for receiving said realigned data from the crosspoint switching means and for providing said realigned data to the second memory at the second address, wherein said received data is realigned by said crosspoint switching means as said data is read from said first storage means to said second storage means.

2. An apparatus for realigning database fields as recited in claim 1, further comprising request queue means for receiving and queuing data realignment requests from a first processor; and control means, coupled to the request queue means and the mapping table means, for reading one of the data realignment requests from the request queue means and for addressing an entry in the mapping table means corresponding to a database record identified in the one of the data realignment requests;

wherein the mapping table means further comprises third register means for receiving the entry addressed by the control means and wherein the crosspoint switching means is coupled to the mapping table means by the third register means.

3. An apparatus for realigning database fields for use with a host computer having a system memory, said apparatus comprising:

a mapping table comprising a plurality of entries, each of the entries corresponding to a plurality of database records, wherein each of the entries comprises:
a control field for holding a data realignment bit mask indicative of at least one data byte within each of the plurality of database records;
a first address field for holding a first address in a first memory; and
a second address field for holding a second address in the system memory;

a first buffer for storing database fields;

a second buffer; and a crosspoint switch, coupled to the first buffer and the second buffer, and having a control input coupled to the mapping table so as to receive the data realignment mask, wherein said crosspoint switch realigns data as it is read from said first buffer to said second buffer.

* * * * *